(12) United States Patent
Aratame

(10) Patent No.: US 12,188,209 B2
(45) Date of Patent: Jan. 7, 2025

(54) SYSTEM COMPRISING WORK MACHINE, AND WORK MACHINE THAT CREATE A TWO-DIMENSIONAL IMAGE OF A THREE-DIMENSIONAL MODEL

(71) Applicant: KOMATSU LTD., Tokyo (JP)

(72) Inventor: Hiroyuki Aratame, Tokyo (JP)

(73) Assignee: KOMATSU LTD., Tokyo (JP)

( * ) Notice: Subject to any disclaimer, the term of this patent is extended or adjusted under 35 U.S.C. 154(b) by 430 days.

(21) Appl. No.: 17/608,805

(22) PCT Filed: Jun. 23, 2020

(86) PCT No.: PCT/JP2020/024605
§ 371 (c)(1),
(2) Date: Nov. 4, 2021

(87) PCT Pub. No.: WO2021/002245
PCT Pub. Date: Jan. 7, 2021

(65) Prior Publication Data
US 2022/0307233 A1  Sep. 29, 2022

(30) Foreign Application Priority Data
Jul. 1, 2019  (JP) .................................. 2019-123020

(51) Int. Cl.
*G01M 17/00* (2006.01)
*B60R 1/23* (2022.01)
(Continued)

(52) U.S. Cl.
CPC ................ *E02F 9/264* (2013.01); *B60R 1/23* (2022.01); *G06T 7/70* (2017.01); *G06T 15/20* (2013.01);
(Continued)

(58) Field of Classification Search
CPC . B60R 2300/302; B60R 2300/60; B60R 1/23; E02F 9/264; E02F 3/342;
(Continued)

(56) References Cited

U.S. PATENT DOCUMENTS 10,032,117 B2  7/2018  Hodel et al.
2018/0120098 A1  5/2018  Matsuo et al.
(Continued)

FOREIGN PATENT DOCUMENTS

JP  2018-135649 A  8/2018
JP  2019-54464 A  4/2019
(Continued)

OTHER PUBLICATIONS

Zhang Hong et al., "Ergonomic posture recognition using 3D view-invariant features from single ordinary camera", Automation in Construction, Elsevier, Amsterdam, NL, vol. 94, Jun. 6, 2018 (Jun. 6, 2018), pp. 1-10, XP085443122, ISSN: 0926-5805, DOI:10.1016/J.AUTCON.2018.05.033, * section 4.1 *.

(Continued)

*Primary Examiner* — Adam M Alharbi
(74) *Attorney, Agent, or Firm* — Faegre Drinker Biddle & Reath LLP

(57) ABSTRACT

An image clearly displaying a work machine is easily obtained. A posture data generation unit estimates a posture of a work implement with respect to the body of the work machine in a captured image displaying the work machine. A motion state image generation unit creates a three-dimensional model representing a stereoscopic shape of the work machine based on the posture of the work implement. A specific viewpoint image generation unit creates image data including a two-dimensional image of the three-dimensional (Continued)

model, as viewed at a viewpoint position indicating a position of a viewpoint at which the three-dimensional model is virtually viewed.

7 Claims, 15 Drawing Sheets

(51) Int. Cl.
*E02F 9/26* (2006.01)
*G06T 7/70* (2017.01)
*G06T 15/20* (2011.01)
*E02F 3/342* (2006.01)
*E02F 9/22* (2006.01)

(52) U.S. Cl.
CPC ..... *B60R 2300/302* (2013.01); *B60R 2300/60* (2013.01); *E02F 3/342* (2013.01); *E02F 9/2228* (2013.01); *G06T 2207/20081* (2013.01); *G06T 2207/30252* (2013.01)

(58) Field of Classification Search
CPC .......... E02F 9/2228; G06T 7/70; G06T 15/20; G06T 2207/20081; G06T 2207/30252
See application file for complete search history.

(56) References Cited

U.S. PATENT DOCUMENTS

| | | |
|---|---|---|
| 2018/0165502 A1 | 6/2018 | Mianzo et al. |
| 2018/0216318 A1 | 8/2018 | Shike |
| 2020/0040548 A1 | 2/2020 | Shimizu et al. |
| 2020/0050208 A1* | 2/2020 | Frick .................... G06V 10/462 |
| 2020/0240110 A1 | 7/2020 | Takahama et al. |
| 2021/0002871 A1 | 1/2021 | Yamanaka et al. |
| 2021/0087794 A1* | 3/2021 | Yamamoto ............ E02F 9/2033 |
| 2022/0018098 A1* | 1/2022 | Nakagi ................ G02B 27/017 |

FOREIGN PATENT DOCUMENTS

| | | |
|---|---|---|
| JP | 2019-214835 A | 12/2019 |
| WO | WO-2016/170665 A1 | 10/2016 |
| WO | WO-2017/042873 A1 | 3/2017 |

OTHER PUBLICATIONS

Gong Yue et al., "Recognition of Bucket on Excavator Based on Invariant Moment and Back Propagation Neural Network," Feb. 20, 2017 (Feb. 20, 2017), Machine Design and Research vol. 33, No. 01, pp. 178-181.

Partial English translation of First Chinese Office Action issued May 31, 2024 in Application No. 202080035827X.

* cited by examiner

SYSTEM COMPRISING WORK MACHINE, AND WORK MACHINE THAT CREATE A TWO-DIMENSIONAL IMAGE OF A THREE-DIMENSIONAL MODEL

TECHNICAL FIELD

The present disclosure relates to a system comprising a work machine, and the work machine.

BACKGROUND ART

A wheel loader comprises a vertically movable boom having a distal end provided with a bucket rotatable with respect to the boom. When the wheel loader is operated to perform an excavation work, a vehicle is moved forward to push the bucket into a mass of soil and the boom is also raised. Thus, the soil is scooped on the bucket.

A conventionally proposed wheel loader comprises a sensor for detecting an inclination angle of a boom with respect to a horizontal direction and a sensor for detecting an inclination angle of a bucket with respect to the boom (see, for example, Japanese Patent Laid-Open No. 2018-135649 (PTL 1)).

CITATION LIST

Patent Literature

PTD 1: Japanese Patent Laying-Open No. 2018-135649

SUMMARY OF INVENTION

Technical Problem

A wheel loader has a sensor mounted therein/thereon to detect a posture of a work implement, and is configured to classify a work from the posture of the work implement detected by the sensor. In contrast, small and other similar, inexpensive models have no sensor mounted therein/thereon and thus cannot detect a posture of the work implement with a sensor.

As a wheel loader performs work while moving with respect to various objects, there are many disturbances, and thus it is difficult to classify a work into a type by image processing with high accuracy.

According to the present disclosure, a system comprising a work machine that can easily obtain an image used for classifying a work into a type, that clearly displays the work machine, and the work machine, are provided.

Solution to Problem

According to an aspect of the present disclosure, there is provided a system including a work machine, the system comprising the work machine and a computer. The work machine includes a body of the work machine and a work implement attached to the body of the work machine. The computer estimates a posture of the work implement with respect to the body of the work machine in a captured image displaying the work machine, creates a three-dimensional model representing a stereoscopic shape of the work machine based on the posture of the work implement, and creates image data including a two-dimensional image of the three-dimensional model as viewed at a viewpoint position indicating a position of a viewpoint at which the three-dimensional model is virtually viewed.

According to an aspect of the present disclosure, there is provided a work machine comprising: a body of the work machine; a work implement attached to the body of the work machine; and a computer mounted in the body of the work machine. The computer estimates a posture of the work implement with respect to the body of the work machine in a captured image displaying the work machine, creates a three-dimensional model representing a stereoscopic shape of the work machine based on the posture of the work implement, and creates image data including a two-dimensional image of the three-dimensional model as viewed at a viewpoint position indicating a position of a viewpoint at which the three-dimensional model is virtually viewed.

Advantageous Effects of Invention

According to the present disclosure, an image clearly displaying a work machine can be easily obtained. The image can be used to classify a work into a type with high accuracy.

DESCRIPTION OF EMBODIMENTS

Hereinafter, an embodiment will be described with reference to the drawings. In the following description, identical components are identically denoted. Their names and functions are also identical. Accordingly, they will not be described repeatedly in detail.

General Configuration

Figure 1:
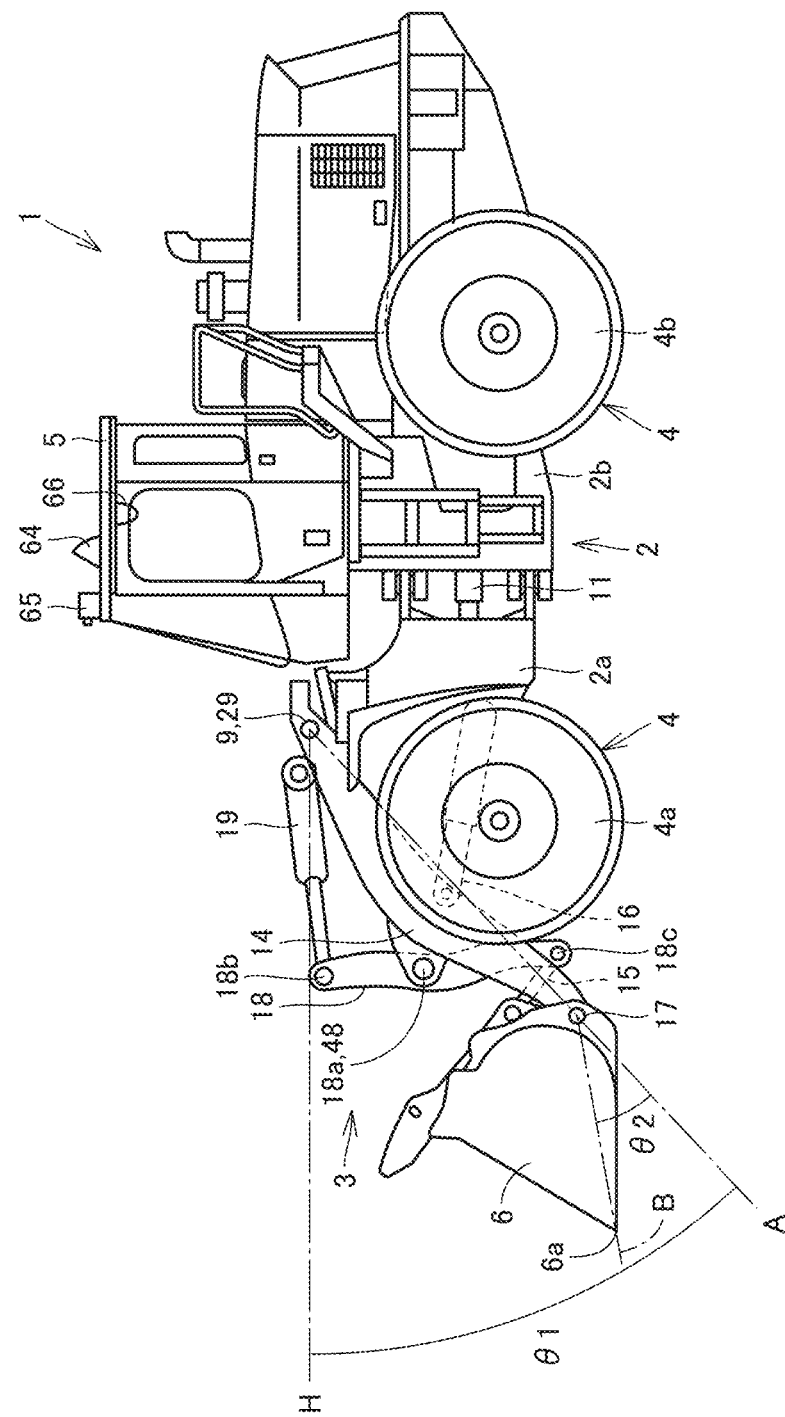
FIG. 1 is a side view of a wheel loader as an example of a work machine.

In an embodiment, as one example of a work machine, a wheel loader 1 will be described. FIG. 1 is a side view of wheel loader 1 as an example of the work machine according to the embodiment.

As shown in FIG. 1, wheel loader 1 comprises a vehicular body frame 2, a work implement 3, a traveling apparatus 4, and a cab 5. Vehicular body frame 2, cab 5 and the like configure the vehicular body of wheel loader 1 (the body of the work machine). Work implement 3 and traveling apparatus 4 are attached to the vehicular body of wheel loader 1.

Traveling apparatus 4 is for causing the vehicular body of wheel loader 1 to travel, and includes traveling wheels 4a and 4b. When traveling wheels 4a and 4b are rotationally driven, wheel loader 1 can travel by itself, and perform a desired work using work implement 3.

Vehicular body frame 2 includes a front frame 2a and a rear frame 2b. Front frame 2a and rear frame 2b are attached to be capable of mutually swinging rightward and leftward. A pair of steering cylinders 11 is attached across front frame 2a and rear frame 2b. Steering cylinder 11 is a hydraulic cylinder. Steering cylinder 11 is extended and retracted by hydraulic oil received from a steering pump (not shown) to change rightward and leftward a direction in which wheel loader 1 travels.

In the present specification, a direction in which wheel loader 1 travels straight forward/rearward is referred to as a forward/rearward direction of wheel loader 1. In the forward/rearward direction of wheel loader 1, a side on which work implement 3 is located with respect to vehicular body frame 2 is defined as a forward direction, and a side opposite to the forward direction is defined as a rearward direction. A rightward/leftward direction of wheel loader 1 is a direction orthogonal to the forward/rearward direction in a plan view. When looking in the forward direction, a right side and a left side in the rightward/leftward direction are a rightward direction and a rightward direction, respectively. An upward/downward direction of wheel loader 1 is a direction orthogonal to a plane defined by the forward/rearward direction and the rightward/leftward direction. In the upward/downward direction, a side on which the ground is present is a downward side, and a side on which the sky is present is an upward side.

Work implement 3 and a pair of traveling wheels (front wheels) 4a are attached to front frame 2a. Work implement 3 is disposed in front of the vehicular body. Work implement 3 is driven by hydraulic oil received from a work implement pump 25 (see FIG. 2). Work implement pump 25 is a hydraulic pump that is driven by an engine 20 and pumps out hydraulic oil to operate work implement 3. Work implement 3 includes a boom 14, and a bucket 6 serving as a work tool. Bucket 6 is disposed at a distal end of work implement 3. Bucket 6 is an example of an attachment detachably attached to a distal end of boom 14. Depending on the type of work, the attachment is replaced by a grapple, a fork, a plow, or the like.

Boom 14 has a proximal end portion rotatably attached to front frame 2a by a boom pin 9. Bucket 6 is rotatably attached to boom 14 by a bucket pin 17 located at the distal end of boom 14.

Front frame 2a and boom 14 are coupled by a pair of boom cylinders 16. Boom cylinder 16 is a hydraulic cylinder. Boom cylinder 16 has a proximal end attached to front frame 2a. Boom cylinder 16 has a distal end attached to boom 14. Boom 14 is moved up and down when boom cylinder 16 is extended and retracted by hydraulic oil received from work implement pump 25 (see FIG. 2). Boom cylinder 16 drives boom 14 to pivot up and down about boom pin 9.

Work implement 3 further includes a bell crank 18, a bucket cylinder 19, and a link 15. Bell crank 18 is rotatably supported by boom 14 via a support pin 18a located substantially at the center of boom 14. Bucket cylinder 19 couples bell crank 18 and front frame 2a together. Link 15 is coupled to a coupling pin 18c provided at a distal end portion of bell crank 18. Link 15 couples bell crank 18 and bucket 6 together.

Bucket cylinder 19 is a hydraulic cylinder and work tool cylinder. Bucket cylinder 19 has a proximal end attached to front frame 2a. Bucket cylinder 19 has a distal end attached to a coupling pin 18b provided at a proximal end portion of bell crank 18. When bucket cylinder 19 is extended and retracted by hydraulic oil received from work implement pump 25 (see FIG. 2), bucket 6 pivots up and down. Bucket cylinder 19 drives bucket 6 to pivot about bucket pin 17.

Cab 5 and a pair of traveling wheels (rear wheels) 4b are attached to rear frame 2b. Cab 5 is disposed behind boom 14. Cab 5 is mounted on vehicular body frame 2. In cab 5, a seat seated by an operator, an operation apparatus described hereinafter, and the like are disposed.

A position detection sensor 64 is disposed on the roof of cab 5. Position detection sensor 64 includes a GNSS antenna and a global coordinate calculator. The GNSS antenna is an antenna for global navigation satellite systems (RTK-GNSS (Real Time Kinematic—Global Navigation Satellite Systems)).

An imaging device 65 is also mounted on the roof of cab 5. Imaging device 65 in the embodiment is a monocular camera. Imaging device 65 is disposed at a front end portion of the roof of cab 5. Imaging device 65 captures an image in front of cab 5. Imaging device 65 captures an image of work implement 3. The image captured by imaging device 65 includes at least a portion of work implement 3.

An inertial measurement unit (IMU) 66 is arranged in cab 5. IMU 66 detects an inclination of vehicular body frame 2. IMU 66 detects an angle of inclination of vehicular body frame 2 with respect to the forward/rearward direction and the rightward/leftward direction.

Figure 2:
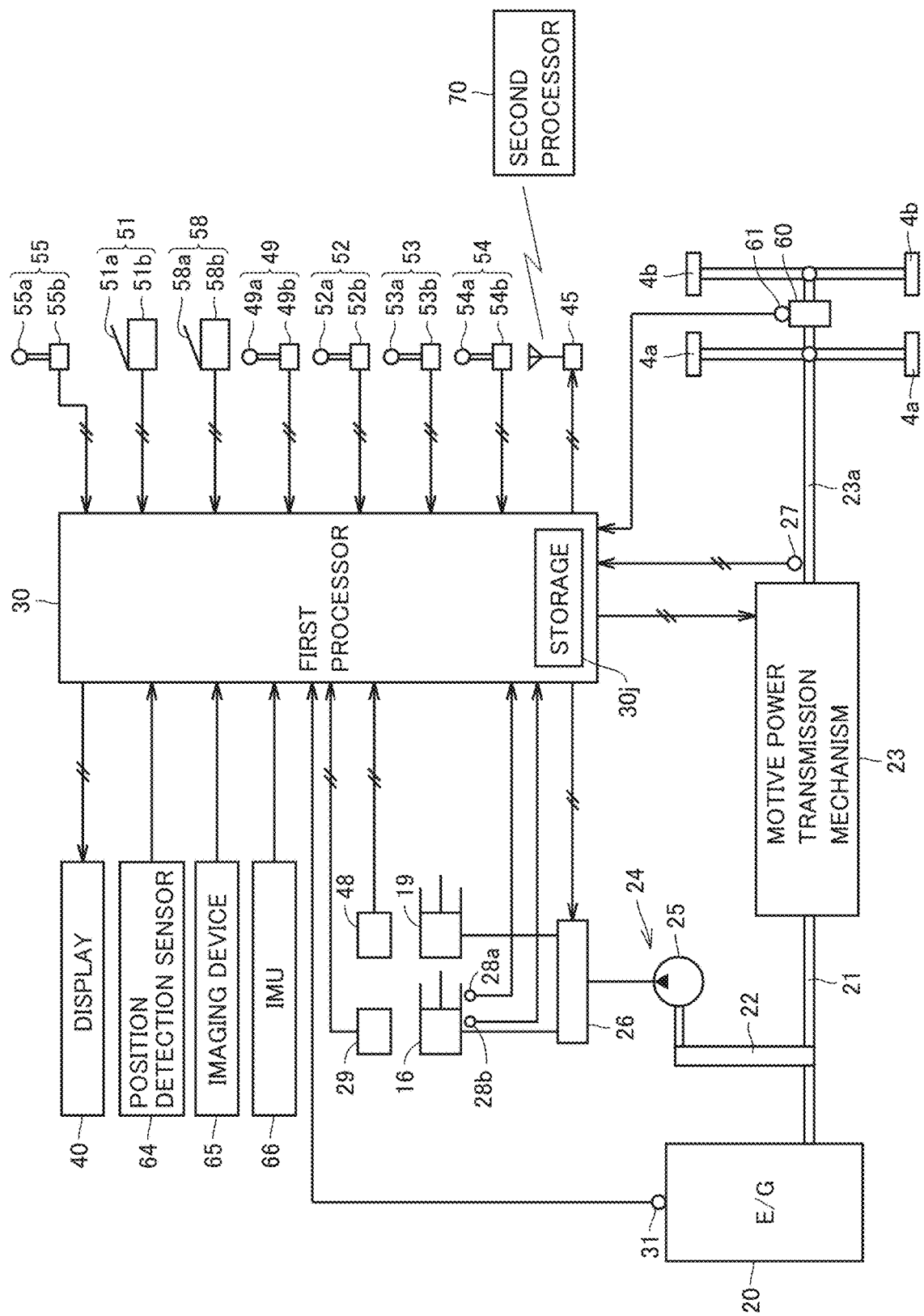
FIG. 2 is a schematic block diagram generally showing a configuration of a system including the wheel loader.

FIG. 2 is a schematic block diagram showing a configuration of the entire system including wheel loader 1 according to the embodiment. Referring to FIG. 2, the entire system according to the embodiment includes wheel loader 1 and a second processor provided to be able to establish wireless or wired communication with wheel loader 1.

Wheel loader 1 includes engine 20, a motive power extraction unit 22, a motive power transmission mechanism 23, a cylinder driving unit 24, a first angle detector 29, a second angle detector 48, a pivot mechanism 60, and a first processor 30 (a controller).

Engine 20 is, for example, a diesel engine. Output from engine 20 is controlled by adjusting an amount of fuel to be injected into a cylinder of engine 20. Engine 20 is provided with a temperature sensor 31. Temperature sensor 31 outputs a detection signal representing a temperature to first processor 30.

Motive power extraction unit 22 is an apparatus that distributes output from engine 20 to motive power transmission mechanism 23 and cylinder driving unit 24. Motive power transmission mechanism 23 is a mechanism that transmits driving force from engine 20 to front wheel 4a and rear wheel 4b, and it is implemented, for example, by a transmission. Motive power transmission mechanism 23 changes a rotational speed of an input shaft 21 and outputs resultant rotation to an output shaft 23a. A vehicular speed detection unit 27 that detects a speed of wheel loader 1 is attached to output shaft 23a of motive power transmission mechanism 23. Wheel loader 1 includes vehicular speed detection unit 27.

Vehicular speed detection unit 27 is implemented, for example, by a vehicular speed sensor. Vehicular speed detection unit 27 detects a rotational speed of output shaft 23a to detect a speed of movement of wheel loader 1 made by traveling apparatus 4 (FIG. 1). Vehicular speed detection unit 27 functions as a rotation sensor that detects a rotational speed of output shaft 23a. Vehicular speed detection unit 27 functions as a movement detector that detects movement made by traveling apparatus 4. Vehicular speed detection unit 27 outputs a detection signal representing a vehicular speed of wheel loader 1 to first processor 30.

Cylinder driving unit 24 includes work implement pump 25 and a control valve 26. Output from engine 20 is transmitted to work implement pump 25 through motive power extraction unit 22. Hydraulic oil delivered from work implement pump 25 is supplied to boom cylinder 16 and bucket cylinder 19 through control valve 26.

First hydraulic pressure detectors 28a and 28b that detect a hydraulic pressure in an oil chamber in boom cylinder 16 are attached to boom cylinder 16. Wheel loader 1 includes first hydraulic pressure detectors 28a and 28b. First hydraulic pressure detectors 28a and 28b include, for example, a pressure sensor 28a for head pressure detection and a pressure sensor 28b for bottom pressure detection.

Pressure sensor 28a is attached to a head side of boom cylinder 16. Pressure sensor 28a can detect a pressure (a head pressure) of hydraulic oil in the oil chamber on a side of a cylinder head of boom cylinder 16. Pressure sensor 28a outputs a detection signal representing a head pressure of boom cylinder 16 to first processor 30. Pressure sensor 28b is attached to a bottom side of boom cylinder 16. Pressure sensor 28b can detect a pressure (a bottom pressure) of hydraulic oil in the oil chamber on a side of a cylinder bottom of boom cylinder 16. Pressure sensor 28b outputs a detection signal representing a bottom pressure of boom cylinder 16 to first processor 30.

For example, a potentiometer attached to boom pin 9 is employed as first angle detector 29. First angle detector 29 detects a boom angle representing a lift angle (a tilt angle) of boom 14. First angle detector 29 outputs a detection signal representing a boom angle to first processor 30.

Specifically, as shown in FIG. 1, a boom reference line A is a straight line passing through the center of boom pin 9 and the center of bucket pin 17. A boom angle $\theta 1$ is an angle formed by a horizontal line H extending forward from the center of boom pin 9 and boom reference line A. A case where boom reference line A is horizontal is defined as a boom angle $\theta 1=0°$. When boom reference line A is above horizontal line H, boom angle $\theta 1$ is positive. When boom reference line A is below horizontal line H, boom angle $\theta 1$ is negative.

A second angle detector 48 is, for example, a potentiometer attached to support pin 18a. Second angle detector 48 detects a bucket angle representing an angle by which bucket 6 is tilted with respect to boom 14. Second angle detector 48 outputs a detection signal indicating the bucket angle to first processor 30.

Specifically, as shown in FIG. 1, bucket reference line B is a straight line passing through the center of bucket pin 17 and teeth 6a of bucket 6. Bucket angle $\theta 2$ is an angle formed by boom reference line A and bucket reference line B. A case where while bucket 6 is in contact with the ground and also has teeth 6a horizontally on the ground is defined as a bucket angle $\theta 2=0°$. When bucket 6 is moved in a direction for excavation (or upward), bucket angle $\theta 2$ is positive. When bucket 6 is moved in a direction for dumping (or downward), bucket angle $\theta 2$ is negative.

Second angle detector 48 may detect bucket angle $\theta 2$ by detecting an angle of bell crank 18 with respect to boom 14 (hereinafter referred to as a bell crank angle). A bell crank angle is an angle formed by a straight line passing through the center of support pin 18a and the center of coupling pin 18b, and boom reference line A. Second angle detector 48 may be a potentiometer or a proximity switch attached to bucket pin 17. Alternatively, second angle detector 48 may be a stroke sensor disposed on bucket cylinder 19.

Pivot mechanism 60 pivotably couples front frame 2a and rear frame 2b to each other. Front frame 2a is pivoted with respect to rear frame 2b by extending and contracting an articulation cylinder coupled between front frame 2a and rear frame 2b. By angling (articulating) front frame 2a with respect to rear frame 2b, a radius of revolution in revolution of the wheel loader can be made smaller and a ditch digging work or a grading work by offset running can be done. Pivot mechanism 60 is provided with an articulation angle sensor 61. Articulation angle sensor 61 detects an articulation angle. Articulation angle sensor 61 outputs a detection signal representing the articulation angle to first processor 30.

Position detection sensor 64 outputs a detection signal indicating a position of wheel loader 1 to first processor 30. Imaging device 65 outputs an image captured thereby to first processor 30. IMU 66 outputs a detection signal indicating an inclination angle of wheel loader 1 to first processor 30.

As shown in FIG. 2, wheel loader 1 includes in cab 5, an operation apparatus operated by an operator. The operation apparatus includes a forward and rearward travel switching apparatus 49, an accelerator operation apparatus 51, a boom operation apparatus 52, a shift change operation apparatus 53, a bucket operation apparatus 54, and a brake operation apparatus 58.

Forward and rearward travel switching apparatus 49 includes a forward and rearward travel switching operation member 49a and a forward and rearward travel switching detection sensor 49b. Forward and rearward travel switching operation member 49a is operated by an operator for indicating switching between forward travel and rearward travel of the vehicle. Forward and rearward travel switching operation member 49a can be switched to a position of each of forward travel (F), neutral (N), and rearward travel (R). Forward and rearward travel switching detection sensor 49b detects a position of forward and rearward travel switching operation member 49a. Forward and rearward travel switching detection sensor 49b outputs to first processor 30 a detection signal (forward travel, neutral, or rearward travel) representing a command to travel forward or rearward as indicated by a position of forward and rearward travel switching operation member 49a. Forward and rearward travel switching apparatus 49 includes an FNR switch lever capable of switching among forward travel (F), neutral (N), and rearward travel (R).

Accelerator operation apparatus 51 includes an accelerator operation member 51a and an accelerator operation detection unit 51b. Accelerator operation member 51a is operated by an operator for setting a target rotational speed of engine 20. Accelerator operation detection unit 51*b* detects an amount of operation onto accelerator operation member 51*a* (an amount of accelerator operation). Accelerator operation detection unit 51*b* outputs a detection signal representing an amount of accelerator operation to first processor 30.

Brake operation apparatus 58 includes a brake operation member 58*a* and a brake operation detection unit 58*b*. Brake operation member 58*a* is operated by an operator for controlling deceleration force of wheel loader 1. Brake operation detection unit 58*b* detects an amount of operation onto brake operation member 58*a* (an amount of brake operation). Brake operation detection unit 58*b* outputs a detection signal representing an amount of brake operation to first processor 30. A pressure of brake oil may be used as an amount of brake operation.

Boom operation apparatus 52 includes a boom operation member 52*a* and a boom operation detection unit 52*b*. Boom operation member 52*a* is operated by an operator for raising or lowering boom 14. Boom operation detection unit 52*b* detects a position of boom operation member 52*a*. Boom operation detection unit 52*b* outputs to first processor 30 a detection signal representing a command to raise or lower boom 14 indicated by the position of boom operation member 52*a*.

Shift change operation apparatus 53 includes a shift change operation member 53*a* and a shift change operation detection unit 53*b*. Shift change operation member 53*a* is operated by an operator for controlling shift change from input shaft 21 to output shaft 23*a* in motive power transmission mechanism 23. Shift change operation detection unit 53*b* detects a position of shift change operation member 53*a*. Shift change operation detection unit 53*b* outputs a shift change detection command indicated by the position of shift change operation member 53*a* to first processor 30.

Bucket operation apparatus 54 includes a bucket operation member 54*a* and a bucket operation detection unit 54*b*. Bucket operation member 54*a* is operated by an operator for causing bucket 6 to carry out an excavating motion or a dumping motion. Bucket operation detection unit 54*b* detects a position of bucket operation member 54*a*. Bucket operation detection unit 54*b* outputs to first processor 30 a detection signal representing a command for an operation in a tilt-back direction or a dump direction of bucket 6 indicated by a position of bucket operation member 54*a*.

Articulation operation apparatus 55 includes an articulation operation member 55*a* and an articulation operation detection unit 55*b*. Articulation operation member 55*a* is operated by an operator for angling (articulating) front frame 2*a* with respect to rear frame 2*b* with pivot mechanism 60 being interposed. Articulation operation detection unit 55*b* detects a position of articulation operation member 55*a*. Articulation operation detection unit 55*b* outputs to first processor 30 a detection signal representing a left angling command or a right angling command indicated by a position of articulation operation member 55*a*.

First processor 30 is implemented by a microcomputer including a storage such as a random access memory (RAM) or a read only memory (ROM) and a computing device such as a central processing unit (CPU). First processor 30 may be implemented as some of functions of a controller of wheel loader 1 that controls motions of engine 20, work implement 3 (boom cylinder 16, bucket cylinder 19, and the like), and motive power transmission mechanism 23. A signal representing a forward and rearward travel command detected by a forward and rearward travel switching apparatus 49, a signal representing a vehicular speed of wheel loader 1 detected by vehicular speed detection unit 27, a signal representing a boom angle detected by first angle detector 29, a signal representing a head pressure of boom cylinder 16 detected by pressure sensor 28*a*, and a signal representing a bottom pressure of boom cylinder 16 detected by pressure sensor 28*b* are mainly input to first processor 30.

Wheel loader 1 further includes a display 40 and an output unit 45. Display 40 is implemented by a monitor arranged in cab 5 and viewed by an operator.

Output unit 45 outputs work machine motion information including motion information of wheel loader 1 to a server (a second processor 70) provided outside wheel loader 1. Output unit 45 may output work machine motion information including motion information of wheel loader 1 every prescribed period or may collectively output work machine motion information over a plurality of periods. Output unit 45 may have a communication function such as wireless communication and may communicate with second processor 70. Alternatively, output unit 45 may be implemented, for example, by an interface of a portable storage (such as a memory card) that can be accessed from second processor 70. Second processor 70 includes a display that performs a monitor function and can show a motion image based on work machine motion information output from output unit 45. Second processor 70 is provided at a position different from a position where wheel loader 1 is provided, and a motion image during works by wheel loader 1 can be recognized on a display at a remote location by way of example.

[Motion of Wheel Loader 1, and Classifying Works into Types]

Wheel loader 1 in the present embodiment performs an excavating motion for scooping an excavated object 100 such as soil in bucket 6 and a loading motion for loading an object (excavated object 100) in bucket 6 onto a transportation machine such as a dump truck 110.

Figure 3:
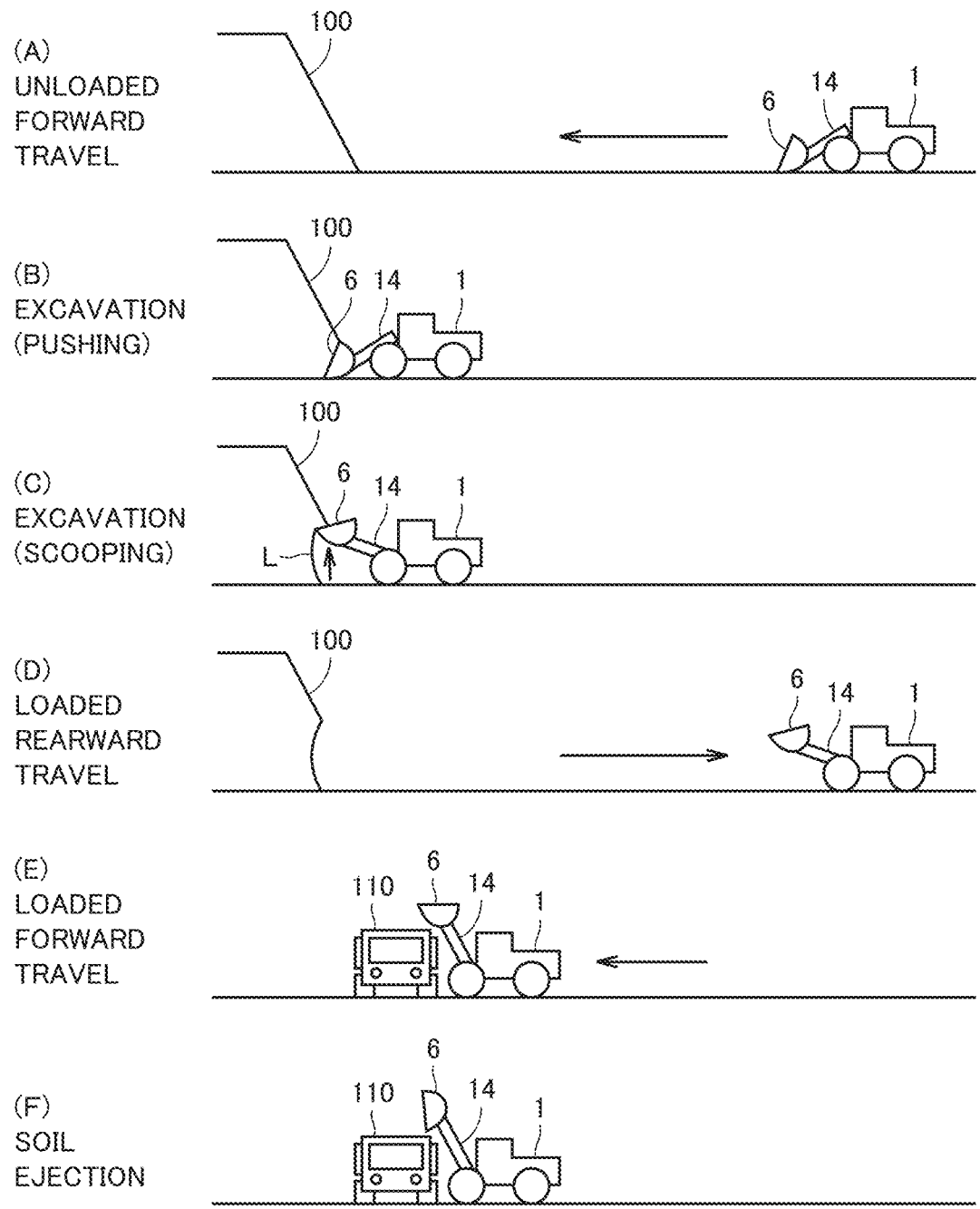
FIG. 3 is a schematic diagram for illustrating a motion of the wheel loader engaged in an excavating and loading work.

FIG. 3 is a schematic diagram illustrating a motion of wheel loader 1 during an excavating and loading work based on the embodiment. Wheel loader 1 excavates an object to be excavated 100 and loads excavated object 100 on a transportation machine such as dump truck 110 by successively repeating a plurality of motions as follows.

As shown in FIG. 3 (A), wheel loader 1 travels forward toward object to be excavated 100. In this unloaded forward travelling motion, an operator operates boom cylinder 16 and bucket cylinder 19 to set work implement 3 to an excavating posture in which the tip end of boom 14 is located at a low position and bucket 6 is horizontally oriented, and moves wheel loader 1 forward toward object to be excavated 100.

As shown in FIG. 3 (B), the operator moves wheel loader 1 forward until teeth 6*a* of bucket 6 are pushed into object to be excavated 100. In this excavating (pushing) motion, teeth 6*a* of bucket 6 are pushed into object to be excavated 100.

As shown in FIG. 3 (C), the operator thereafter operates boom cylinder 16 to raise bucket 6 and operates bucket cylinder 19 to tilt back bucket 6. In this excavating (scooping) motion, bucket 6 is raised along a bucket track L as shown with a curved arrow in the figure and excavated object 100 is scooped into bucket 6. An excavation work for scooping excavated object 100 is thus performed.

Depending on a type of excavated object 100, the scooping motion may be completed simply by tilting back bucket 6 once. Alternatively, in the scooping motion, a motion to tilt back bucket 6, set the bucket to a neutral position, and tilt back the bucket again may be repeated.

As shown in FIG. 3 (D), after excavated object 100 is scooped into bucket 6, the operator moves wheel loader 1 rearward in a loaded rearward traveling motion. The operator may raise the boom while moving the vehicle rearward, or may raise the boom while moving the vehicle forward in FIG. 3 (E).

As shown in FIG. 3 (E), the operator moves wheel loader 1 forward to be closer to dump truck 110 while keeping bucket 6 raised or raising bucket 6. As a result of this loaded forward traveling motion, bucket 6 is located substantially directly above a bed of dump truck 110.

As shown in FIG. 3 (F), the operator dumps the excavated object from bucket 6 at a prescribed position and loads objects (excavated object) in bucket 6 on the bed of dump truck 110. This motion is what is called a soil ejecting motion. Thereafter, the operator lowers boom 14 and returns bucket 6 to the excavating posture while the operator moves wheel loader 1 rearward. This motion is a rearward travelling and boom lowering motion. The above is typical motions defining one cycle of the excavating and loading work.

Figure 4:
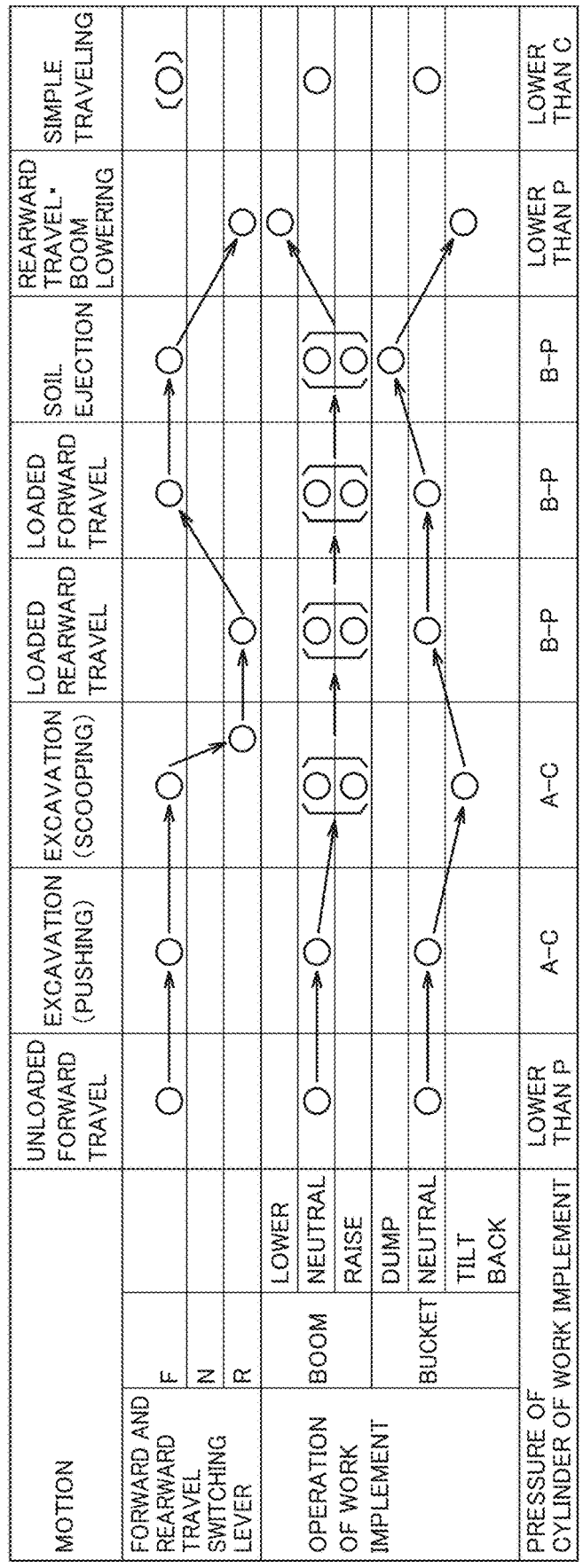
FIG. 4 is a table showing a method for determining a motion of the wheel loader during an excavating and loading work.

FIG. 4 shows a table showing a method of distinguishing a motion of wheel loader 1 during an excavating and loading work. In the table shown in FIG. 4, a row of "motion" at the top lists names of motions shown in FIG. 3 (A) to (F).

The rows of "forward and rearward travel switching lever," "operation of work implement," and "pressure of cylinder of work implement" indicate various criteria used by first processor 30 (see FIG. 2) for determining which motion wheel loader 1 currently makes out of those indicated in FIGS. 3(A) to 3(F). In the present specification, determining which motion wheel loader 1 currently makes during an excavating and loading work is referred to as classifying a work into a type. A work type indicates content of a motion of wheel loader 1 engaged in an excavating and loading work.

More specifically, in the row of "forward and rearward travel switching lever," criteria for a forward and rearward travel switching lever are shown with a circle.

In the row of "operation of work implement," criteria for an operation by an operator onto work implement 3 are shown with a circle. More specifically, in a row of "boom," criteria for an operation onto boom 14 are shown, and in a row of "bucket," criteria for an operation onto bucket 6 are shown.

In the row of "pressure of cylinder of work implement," criteria for a current hydraulic pressure of the cylinder of work implement 3 such as a hydraulic pressure of a cylinder bottom chamber of boom cylinder 16 are shown. Four reference values A, B, C, and P are set in advance for a hydraulic pressure, a plurality of pressure ranges (a range lower than reference value P, a range of reference values A to C, a range of reference values B to P, and a range lower than reference value C) are defined by reference values A, B, C, and P, and these pressure ranges are set as the criteria. Magnitude of four reference values A, B, C, and P is defined as A>B>C>P.

By using a combination of criteria for "forward and rearward travel switching lever," "boom," "bucket," and "pressure of cylinder of work implement" corresponding to each motion, first processor 30 can distinguish which motion wheel loader 1 currently makes.

A specific operation of first processor 30 when control shown in FIG. 4 is carried out will be described below. A combination of criteria for "forward and rearward travel switching lever," "boom," "bucket," and "pressure of cylinder of work implement" corresponding to each work step shown in FIG. 4 is stored in advance in a storage 30j (FIG. 2). First processor 30 recognizes a currently selected forward and rearward travel switching lever (F, N, or R) based on a signal from forward and rearward travel switching apparatus 49. First processor 30 recognizes a type of a current operation onto boom 14 (lowering, neutral, or raising) based on a signal from boom operation detection unit 52b. First processor 30 recognizes a type of a current operation onto bucket 6 (dump, neutral, or tilt back) based on a signal from bucket operation detection unit 54b. First processor 30 recognizes a current hydraulic pressure of the cylinder bottom chamber of boom cylinder 16 based on a signal from pressure sensor 28b shown in FIG. 2.

First processor 30 compares combination of the recognized forward and rearward travel switching lever, the type of the operation onto the boom, the type of the operation onto the bucket, and the hydraulic pressure of the lift cylinder at the current time point (that is, a current state of work) with combination of criteria for "forward and rearward travel switching lever," "boom," "bucket," and "pressure of cylinder of work implement" corresponding to each motion stored in advance. As a result of this comparison processing, first processor 30 determines to which motion the combination of criteria which matches best with the current state of work corresponds.

The combination of criteria corresponding to each motion of the excavating and loading work shown in FIG. 4 is as follows by way of example.

In the unloaded forward traveling motion, the forward and rearward travel switching lever is set to F, the operation of the boom and the operation of the bucket are both set to neutral, and the pressure of the cylinder of the work implement is lower than reference value P. In the excavating (pushing) motion, the forward and rearward travel switching lever is set to F, the operation of the boom and the operation of the bucket are both neutral, and the pressure of the cylinder of the work implement is within the range of reference values A to C. In the excavating (scooping) motion, the forward and rearward travel switching lever is set to F or R, the operation of the boom is raising or neutral, the operation of the bucket is tilt back, and the pressure of the cylinder of the work implement is within the range of reference values A to C. For an operation of the bucket, such a criterion that tilt back and neutral are alternately repeated may further be added because, depending on a state of an excavated object, a motion to tilt back bucket 6, set the bucket to a neutral position, and tilt back the bucket again may be repeated.

In the loaded rearward traveling motion, the forward and rearward travel switching lever is set to R, the operation of the boom is neutral or raising, the operation of the bucket is neutral, and the pressure of the cylinder of the work implement is within the range of reference values B to P. In the loaded forward traveling motion, the forward and rearward travel switching lever is set to F, the operation of the boom is raising or neutral, the operation of the bucket is neutral, and the pressure of the cylinder of the work implement is within the range of reference values B to P. In the soil ejecting motion, the forward and rearward travel switching lever is set to F, the operation of the boom is raising or neutral, the operation of the bucket is dump, and the pressure of the cylinder of the work implement is within the range of reference values B to P.

In the rearward traveling and boom lowering motion, the forward and rearward travel switching lever is set to R, the operation of the boom is lowering, the operation of the bucket is tilt back, and the pressure of the cylinder of the work implement is lower than reference value P.

FIG. 4 further shows a simple traveling motion in which wheel loader 1 simply travels. In the simple traveling motion, the operator moves wheel loader 1 forward with boom 14 set at a low position. In doing so, the wheel loader may travel with bucket 6 loaded or unloaded. In the simple traveling motion, the forward and rearward travel switching lever is set to F, the operation of the boom and the operation of the bucket are both neutral, and the pressure of the cylinder of the work implement is less than reference value C.

Information on motion of wheel loader 1 determined by first processor 30 is output as a part of work machine motion information to second processor 70 through output unit 45.

<Detailed Configuration of Computer 102A>

Figure 5:
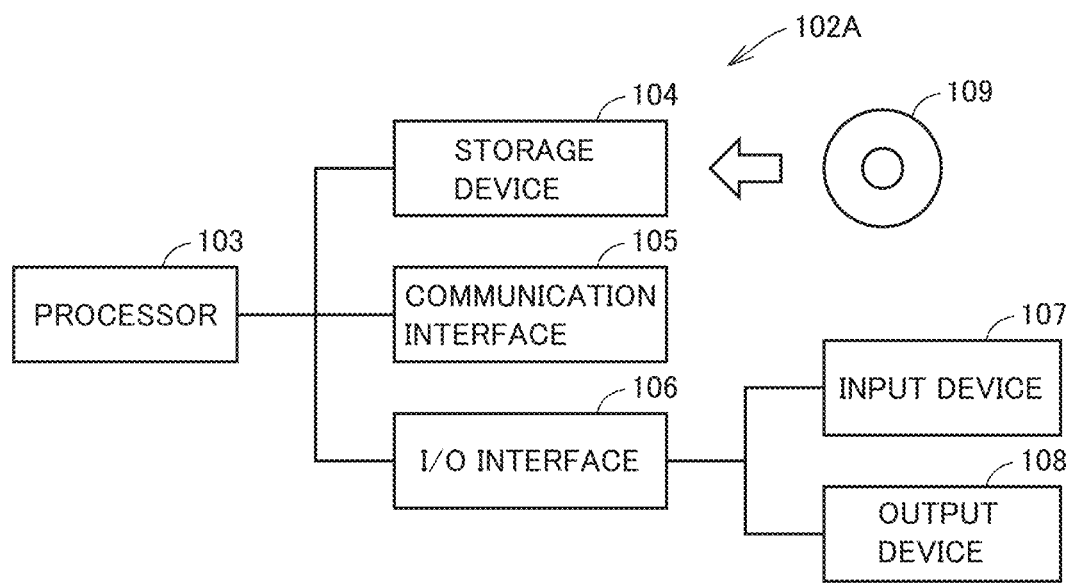
FIG. 5 is a schematic diagram showing a configuration of a computer included in the system including the work machine.

FIG. 5 is a schematic diagram showing a configuration of a computer 102A included in a system including the work machine. The system according to the embodiment is a system that obtains an image clearly displaying the work machine and uses the image for classifying a work into a type without using the table described with reference to FIG. 4 while wheel loader 1 is engaged in an excavating and loading work. Computer 102A shown in FIG. 5 configures a portion of first processor 30 shown in FIG. 2. Computer 102A may be designed exclusively for the system according to the embodiment, or may be a general-purpose personal computer (PC).

Computer 102A includes a processor 103, a storage device 104, a communication interface 105, and an I/O interface 106. Processor 103 is for example a CPU.

Storage device 104 includes a medium which stores information such as stored programs and data so as to be readable by processor 103. Storage device 104 includes a RAM (Random Access Memory), or a ROM (Read Only Memory) or a similar system memory, and an auxiliary storage device. The auxiliary storage device may for example be a magnetic recording medium such as a hard disk, an optical recording medium such as a CD (Compact Disc) or a DVD (Digital Versatile Disc), or a semiconductor memory such as a flash memory. Storage device 104 may be built into computer 102A. Storage device 104 may include an external recording medium 109 detachably connected to computer 102A. External recording medium 109 may be a CD-ROM.

Communication interface 105 is, for example, a wired LAN (Local Area Network) module, or a wireless LAN module, and is an interface for performing communications via a communication network. I/O interface 106 is, for example, a USB (Universal Serial Bus) port, and is an interface for connecting to an external device.

Computer 102A is connected to an input device 107 and an output device 108 via I/O interface 106. Input device 107 is a device used by a user for input to computer 102A. Input device 107 includes, for example, a mouse, or a trackball or a similar pointing device. Input device 107 may include a device such as a keyboard for inputting text. Output device 108 includes, for example, a display (display unit 40, see FIG. 2).

Figure 6:
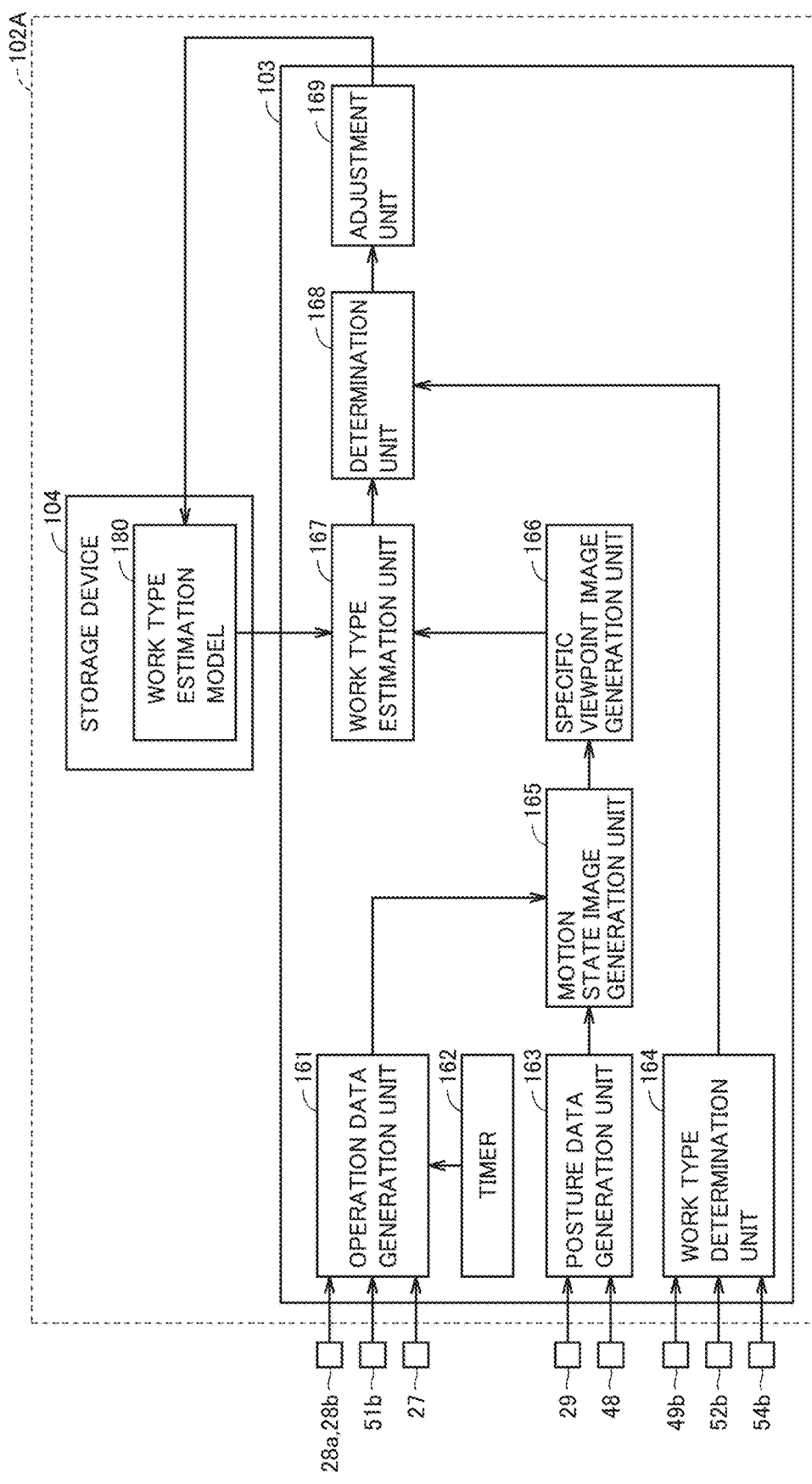
FIG. 6 is a block diagram showing a system configuration of the wheel loader before shipment.

FIG. 6 is a block diagram showing a system configuration of wheel loader 1 before shipment. Processor 103 and storage device 104 shown in FIG. 6 constitute a part of the configuration of computer 102A shown in FIG. 5. Processor 103 includes an operation data generation unit 161.

Operation data generation unit 161 receives from first hydraulic pressure detectors 28a, 28b a detection signal indicative of pressure of hydraulic oil internal to the oil chamber of boom cylinder 16 as detected. Operation data generation unit 161 receives from accelerator operation detection unit 51b a detection signal indicative of an amount of operation of the accelerator as detected. Operation data generation unit 161 receives from vehicular speed detection unit 27 a detection signal indicative of vehicular speed of wheel loader 1 as detected. Vehicular speed detection unit 27 may output a detection signal indicative of a rotational speed of output shaft 23a as detected to operation data generation unit 161, and operation data generation unit 161 may calculate a vehicular speed of wheel loader 1 based on the detection signal.

Processor 103 has a timer 162. Operation data generation unit 161 reads the current time from timer 162, and calculates a period of time elapsing while wheel loader 1 is performing an excavation work since wheel loader 1 started to perform the excavation work.

The excavation work having been started, that is, a motion of wheel loader 1 having transitioned from an unloaded forward traveling motion to an excavating (pushing) motion, is determined by detecting that the hydraulic pressure in the oil chamber of boom cylinder 16 increases when teeth 6a of bucket 6 is pushed into object to be excavated 100 and the load of excavated object 100 starts to act on bucket 6, and confirming through boom angle θ1 and bucket angle θ2 whether work implement 3 is in a posture to start the excavation work. A point in time when the work starts may be determined based on a load received by boom cylinder 16 in the work. When the work starts may be determined based on data of an image of an environment surrounding wheel loader 1, as captured by imaging device 65.

Boom cylinder 16's hydraulic pressure, an amount of operation of the accelerator, vehicular speed, and a period of time elapsing since an excavation work is started are included in operation data for motion of wheel loader 1. The operation data includes data for traveling of wheel loader 1, such as an amount of operation of the accelerator, vehicular speed, etc.

Processor 103 includes a posture data generation unit 163. Posture data generation unit 163 receives from first angle detector 29 a detection signal indicative of boom angle θ1 as detected. Posture data generation unit 163 receives from second angle detector 48 a detection signal indicative of bucket angle θ2 as detected. Boom angle θ1 and bucket angle θ2 configure posture data indicating a posture of work implement 3 with respect to the body of the work machine (or the vehicular body).

Processor 103 includes a work type determination unit 164. Work type determination unit 164 receives from forward and rearward travel switching detection sensor 49b a detection signal indicative of a command to travel forward/rearward, as detected. Work type determination unit 164 receives from boom operation detection unit 52b a detection signal indicative of a command to raise/lower boom 14, as detected. Work type determination unit 164 receives from bucket operation detection unit 54b a detection signal indicative of a command to operate bucket 6 in a direction to tilt it back or dump it, as detected. Work type determination unit 164 receives from first hydraulic pressure detector 28b a detection signal indicative of hydraulic pressure in the cylinder bottom chamber of boom cylinder 16, as detected.

Based on these input detection signals, work type determination unit 164 refers to the FIG. 4 table to determine which motion wheel loader 1 currently makes (i.e., to classify a work into a type).

Processor 103 includes a motion state image generation unit 165. Motion state image generation unit 165 generates motion state image data based on posture data generated in posture data generation unit 163. The motion state image data includes three-dimensional model shape data indicating a stereoscopic shape of wheel loader 1 at work. The three-dimensional model shape data includes data of work implement 3, the vehicular body, traveling wheels 4a and 4b and the like constituting wheel loader 1. The motion state image data also includes operation data generated in operation data generation unit 161.

Processor 103 includes a specific viewpoint image generation unit 166. Specific viewpoint image generation unit 166 generates a two-dimensional image of the three-dimensional model that is generated in motion state image generation unit 165, as viewed at a specific viewpoint position indicating a position of a viewpoint at which the three-dimensional model is virtually viewed. The viewpoint position can be set at any position. A two-dimensional image of the three-dimensional model as viewed in any direction can be generated and displayed by adjusting the viewpoint position. Specific viewpoint image generation unit 166 generates image data including the two-dimensional image. The image data also includes together the operation data generated in operation data generation unit 161.

Processor 103 includes a work type estimation unit 167. Storage device 104 has work type estimation model 180 stored therein.

Work type estimation model 180 is an artificial intelligence model for estimating which motion wheel loader 1 currently makes while it performs a series of motions of an excavating and loading work. Work type estimation model 180 is configured to estimate which motion wheel loader 1 currently makes from the image data generated in specific viewpoint image generation unit 166. Computer 102A uses work type estimation model 180 of artificial intelligence to estimate a motion of wheel loader 1 engaged in an excavating and loading work. Work type estimation unit 167 uses work type estimation model 180 to output an estimated work type, which is a work type estimated from the two-dimensional image of the three-dimensional model of wheel loader 1 as viewed at a specific viewpoint position.

More specifically, work type estimation unit 167 reads work type estimation model 180 from storage device 104. Work type estimation unit 167 inputs image data including the two-dimensional image generated in specific viewpoint image generation unit 166 and the operation data generated in operation data generation unit 161 to work type estimation model 180 to obtain an output of a result of estimation of a work type. Inputting the operation data to work type estimation model 180 in addition to the two-dimensional image of the three-dimensional model of wheel loader 1 enhances accuracy in estimating a work type.

Work type estimation model 180 includes a neural network. Work type estimation model 180 includes, for example, a deep neural network such as a convolutional neural network (CNN).

The model in the embodiment may be implemented in hardware, software executable on hardware, firmware, or a combination thereof. The model may include programs, algorithms, and data executed by processor 103. The model may have functionality performed by a single module or across multiple modules in a distributed manner. The model may be distributed across a plurality of computers.

Processor 103 includes a determination unit 168. Determination unit 168 compares an estimated result obtained by work type estimation unit 167 estimating a work type with a result obtained by work type determination unit 164 classifying a work into a type. Determination unit 168 determines whether the estimated work type output from work type estimation unit 167 matches the result obtained by work type determination unit 164 classifying the work into the type.

Processor 103 includes an adjustment unit 169. Adjustment unit 169 updates work type estimation model 180 based on a result of comparing the estimated work type with the determined work type, as determined by determination unit 168. Work type estimation model 180 is thus trained. Work type estimation model 180 is trained in a factory before wheel loader 1 is shipped therefrom.

<Method for Producing Work Type Estimation Model 180 Trained>

Figure 7:
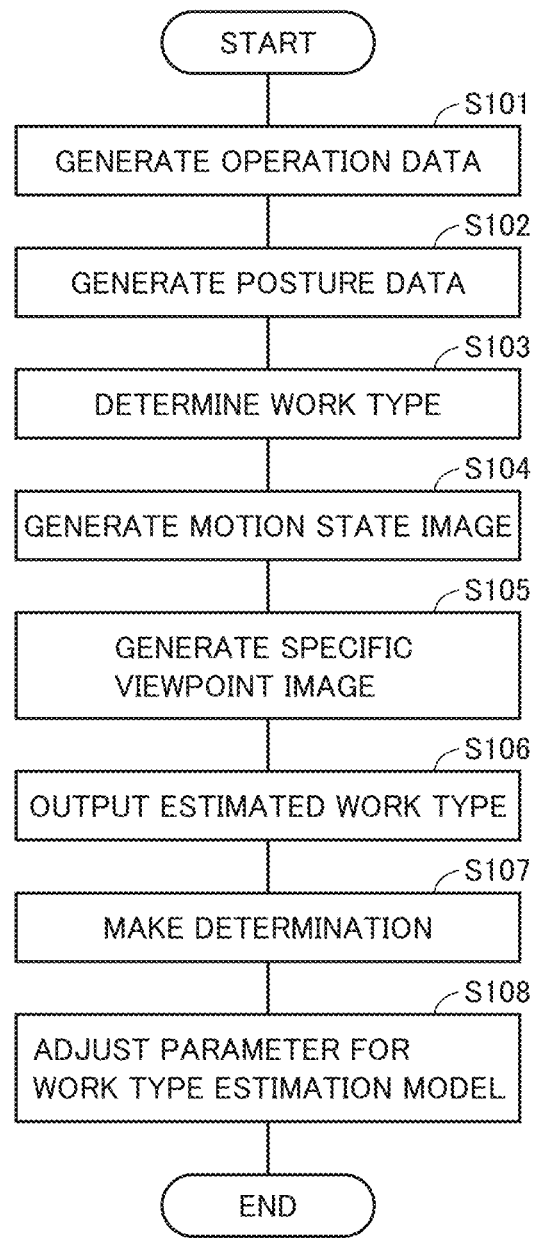
FIG. 7 is a flowchart of a method for producing a trained work type estimation model.
Figure 8:
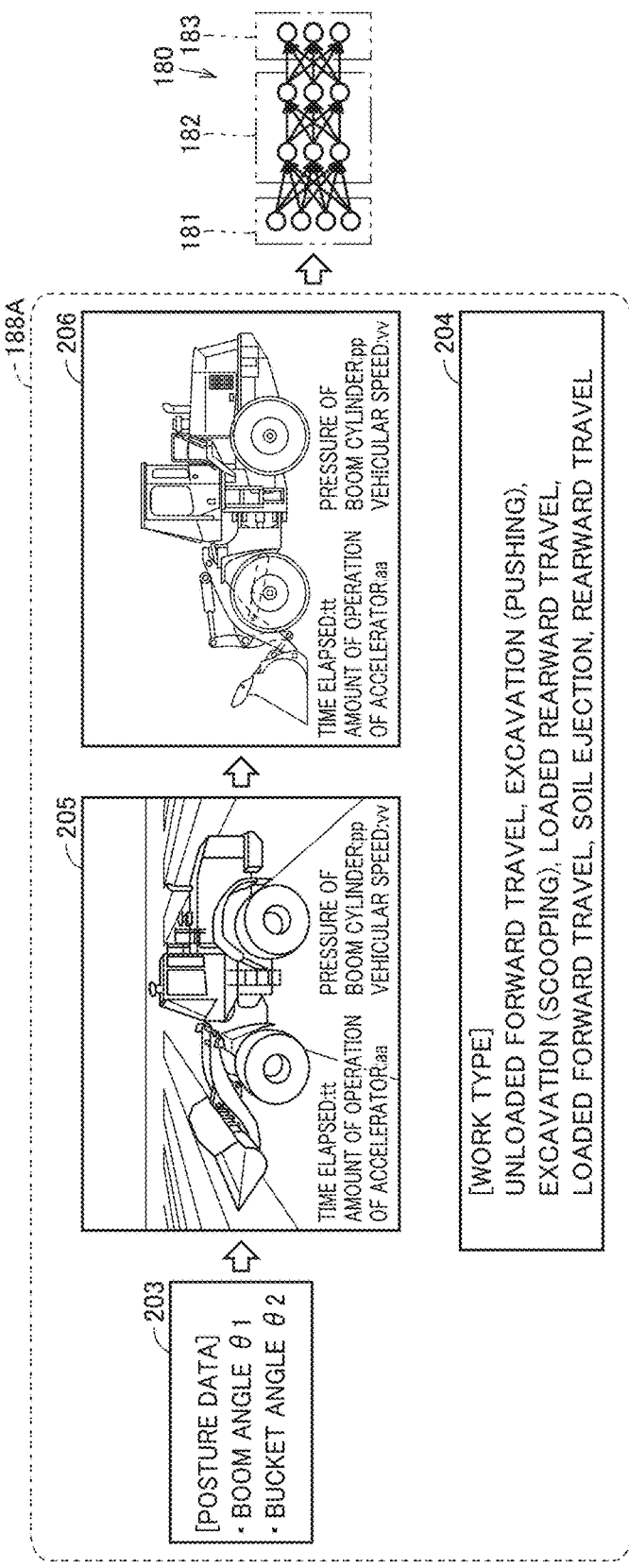
FIG. 8 is a first schematic diagram showing a process for training a work type estimation model.
Figure 9:
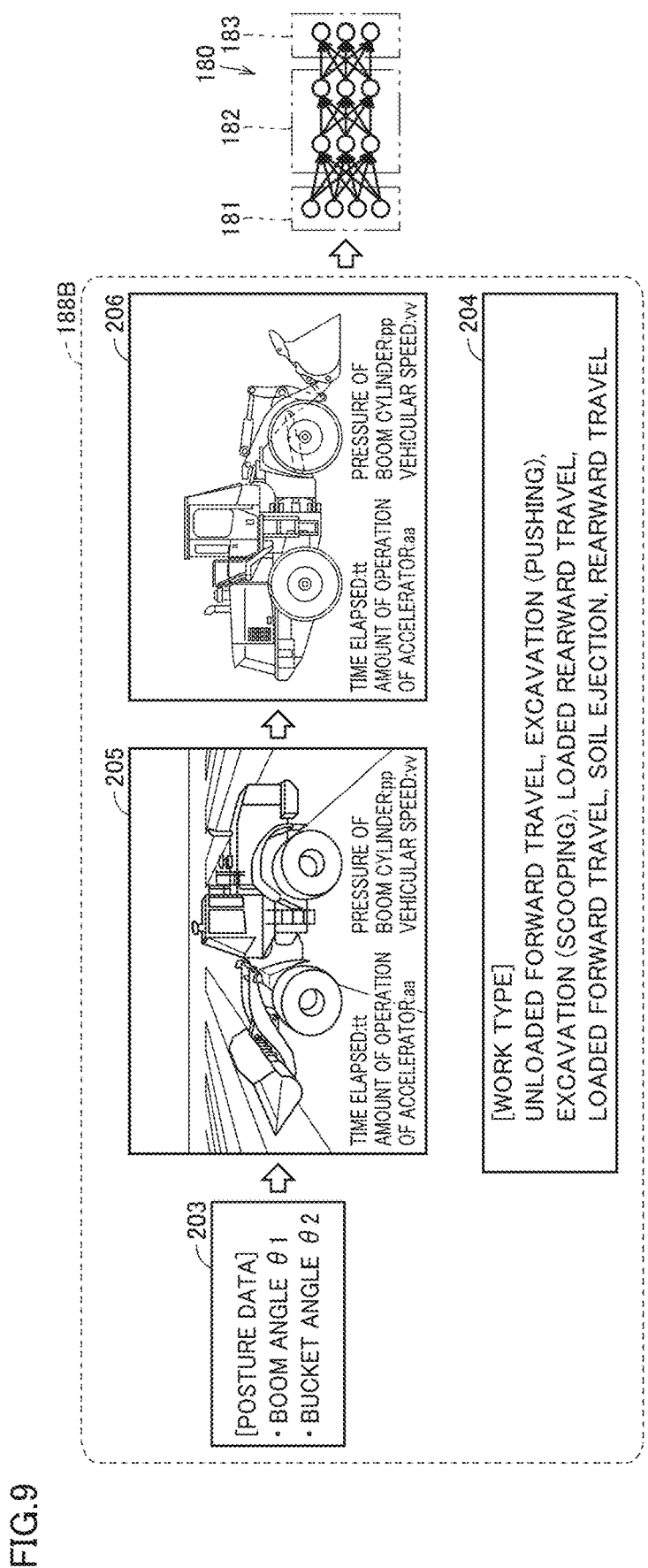
FIG. 9 is a second schematic diagram showing a process for training the work type estimation model.

FIG. 7 is a flowchart of a method for producing work type estimation model 180 trained. FIGS. 8 and 9 are schematic diagrams showing a process for training work type estimation model 180. Although there is some overlapping with what is described with reference to FIG. 6, a process for training work type estimation model 180 to estimate a work type will now be described below with reference to FIGS. 7 to 9.

As shown in FIG. 7, initially, in step S101, operation data is generated. In step S102, posture data 203 is generated. Computer 102A, more specifically, operation data generation unit 161 calculates a period of time elapsing at a point in time during an excavation work since the excavation work was started. Operation data generation unit 161 generates operation data for the point in time, based on a result of detection done by a variety of sensors including first hydraulic pressure detectors 28a, 28b, accelerator operation detection unit 51b, and vehicular speed detection unit 27. Computer 102A, more specifically, posture data generation unit 163 detects boom angle θ1 and bucket angle θ2 made at the point in time, based on a result of detection done by first angle detector 29 and second angle detector 48, to generate posture data 203 (see FIG. 8).

Subsequently, in step S103, a motion of wheel loader 1 is determined. Computer 102A, more specifically, work type determination unit 164 refers to the FIG. 4 table to determine the current motion of wheel loader 1, i.e., classify a work into a type, based on a result of detection done by a variety of sensors including forward and rearward travel switching detection sensor 49b, boom operation detection unit 52b, bucket operation detection unit 54b, and first hydraulic pressure detector 28b, to generate a result 204 of classifying the work into the type (see FIG. 8).

Subsequently, in step S104, a motion state image is generated. Computer 102A, more specifically, motion state image generation unit 165 generates a three-dimensional model representing a stereoscopic shape of wheel loader 1 based on posture data 203. Motion state image 205 shown in FIG. 8 includes wheel loader 1 at work. Motion state image 205 shows work implement 3, the vehicular body, traveling wheels 4a, 4b, and the like constituting wheel loader 1. Motion state image 205 also displays operation data generated in operation data generation unit 161. Motion state image 205 displays time elapsed, the boom cylinder's pressure, an amount of operation of the accelerator, and vehicular speed.

Subsequently, in step S105, a specific viewpoint image is generated. Computer 102A, more specifically, specific viewpoint image generation unit 166 generates a two-dimensional image of the three-dimensional model that is included in motion state image 205 that is generated in step S104, as viewed at a specific viewpoint position indicating a position of a viewpoint at which the three-dimensional model is virtually viewed. The two-dimensional image can also be said to be a virtual captured image obtained by capturing an image of the three-dimensional model with a virtual camera at a viewpoint position. Specific viewpoint image 206 (FIGS. 8 and 9) includes this two-dimensional image. Specific viewpoint image 206 also displays operation data, more specifically, time elapsed, the boom cylinder's pressure, an amount of operation of the accelerator, and vehicular speed.

Specific viewpoint image 206 shown in FIG. 8 includes wheel loader 1 viewed from a left side. The viewpoint position in this case is a position on a left side of wheel loader 1. Specific viewpoint image 206 shown in FIG. 9 includes wheel loader 1 viewed from a right side. The viewpoint position in this case is a position on a right side of wheel loader 1. The viewpoint position can be set at any position. By changing the viewpoint position, a plurality of specific viewpoint images 206 are generated from a single motion state image 205. It is possible to generate a plurality of specific viewpoint images 206 by capturing the single motion state image 205 at any viewpoint position.

Training data 188A shown in FIG. 8 includes specific viewpoint image 206 and result 204 of classifying a work into a type. Training data 188B shown in FIG. 9 similarly includes specific viewpoint image 206 and result 204 of classifying a work into a type. Result 204 of classifying a work into a type serves as a label for specific viewpoint image 206. Result 204 of classifying a work into a type serves as a label for original data for creating specific viewpoint image 206, that is, motion state image 205 and a viewpoint position. Result 204 of classifying a work into a type serves as a label for original data for creating motion state image 205, that is, operation data and posture data 203.

Training data 188A and 188B have the same result 204 of classifying a work into a type as they are generated for wheel loader 1 at the same time, and training data 188A and 188B have different specific viewpoint images 206. By changing a viewpoint position, a plurality of training data 188A and 188B are created from a single motion state image 205. This increases the number of training data for training work type estimation model 180.

Steps S101 to S105 may not necessarily be performed in this order. Step S101 or S102 and step S103 may be performed simultaneously, or steps S101, S102, S104 and S105 performed in this order may be followed by step S103.

Subsequently, in step S106, a work type is estimated. Computer 102A, more specifically, work type estimation unit 167 reads work type estimation model 180 from storage device 104. Work type estimation model 180 includes the neural network shown in FIGS. 8 and 9. The neural network includes an input layer 181, an intermediate layer (or a hidden layer) 182, and an output layer 183. Intermediate layer 182 is multi-layered. Input layer 181, intermediate layer 182 and output layer 183 have one or more units (or neurons). Input layer 181, intermediate layer 182 and output layer 183 can have their respective units set as appropriate in number.

Adjacent layers have their respective units connected to each other, and a weight is set for each connection. A bias is set for each unit. A threshold value is set for each unit. An output value of each unit is determined depending on whether a total sum of a product of a value input to each unit and the weight plus the bias exceeds the threshold value.

Work type estimation model 180 is trained to output a work type estimated from specific viewpoint image 206 including a two-dimensional image of a three-dimensional model that represents a stereoscopic shape of wheel loader 1 at work, as viewed at a specific viewpoint position, and operation data of a motion of wheel loader 1. Work type estimation model 180 has stored in storage device 104 a parameter adjusted through training. The parameter for work type estimation model 180 for example includes the number of layers of the neural network, the number of units in each layer, a relationship between units in connectivity, a weight applied to a connection between each unit and another unit, a bias associated with each unit, and a threshold value for each unit.

Work type estimation unit 167 inputs to input layer 181 specific viewpoint image 206 generated in specific viewpoint image generation unit 166 and including the two-dimensional image and the operation data. Output layer 183 outputs an output value indicating an estimated work type. For example, computer 102A uses specific viewpoint image 206 as an input to input layer 181 to compute forward propagation of the neural network of work type estimation model 180. Thus, computer 102A obtains an estimated work type as an output value output from the neural network at output layer 183.

Subsequently, in step S107, a decision is made on the estimated work type. Computer 102A, more specifically, determination unit 168 compares the estimated work type output from work type estimation model 180 at output layer 183 with result 204 of classifying a work into a type that is included in training data 188A, 188B to determine whether the estimated work type matches result 204 of classifying the work into the type.

Computer 102A trains work type estimation model 180 by using specific viewpoint image 206 as input data, and by using result 204 of classifying a work into a type for that point in time as teaching data. From a result of a determination obtained from comparing the estimated work type with result 204 of classifying the work into the type, computer 102A calculates through back propagation an error of a weight applied to a connection between each unit and another unit, an error of each unit's bias, and an error of the threshold value for each unit.

Subsequently, in step S108, a parameter for work type estimation model 180 is adjusted. Computer 102A, more specifically, adjustment unit 169 adjusts parameters of work type estimation model 180, such as a weight applied to a connection between each unit and another unit, each unit's bias and the threshold value for each unit, based on the result of the determination made by determination unit 168 from comparing the estimated work type with result 204 of classifying the work into the type. Work type estimation model 180 is thus updated. This increases a probability of outputting an estimated work type which matches the teaching data, or result 204 of classifying a work into a type, once the same specific viewpoint image 206 has been input to input layer 181. Work type estimation model 180 has the updated parameters stored to storage device 104.

When a work type is estimated next time, specific viewpoint image 206 is input to the updated work type estimation model 180 to obtain an output of an estimated work type. Computer 102A repeats step S101 to step S108 until work type estimation model 180 outputs an estimated work type that matches result 204 of classifying a work into a type that is obtained at a point in time at which operation data and posture data 203 on which specific viewpoint image 206 is based are obtained. In this way, work type estimation model 180 has its parameters optimized and is thus trained.

Once work type estimation model 180 has sufficiently been trained, and as a result comes to obtain a sufficiently accurately estimated work type, computer 102A ends training work type estimation model 180. Work type estimation model 180 trained is thus produced. Then, the process ends (END).

Initial values for various parameters of work type estimation model 180 may be provided by a template. Alternatively, the initial values for the parameters may be manually given by human input. When retraining work type estimation model 180, computer 102A may prepare initial values for parameters, based on values stored in storage device 104 as parameters of work type estimation model 180 to be retrained.

<Estimating a Work Type Through Work Type Estimation Model 180 Trained>

Figure 10:
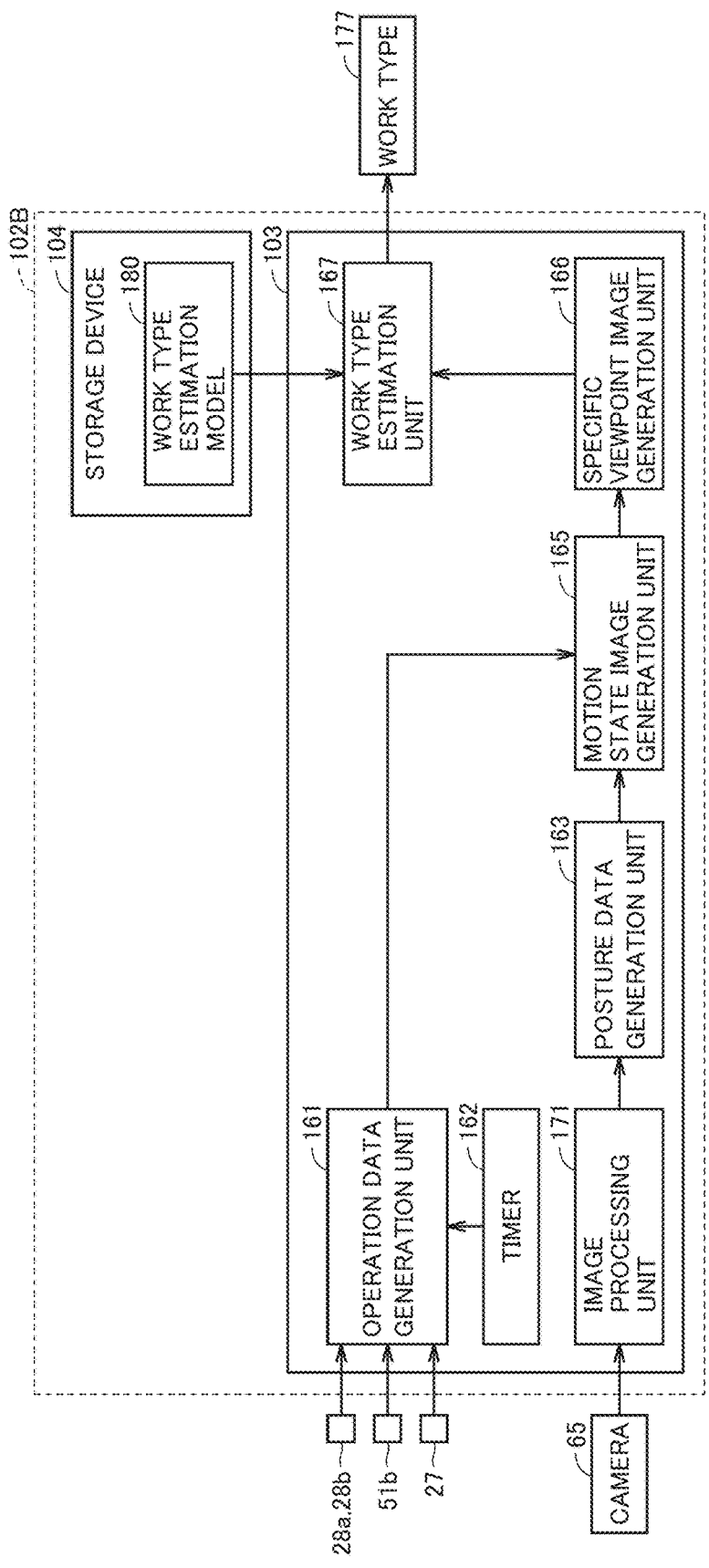
FIG. 10 is a block diagram showing a system configuration of the wheel loader when it is shipped from a factory.

FIG. 10 is a block diagram showing a system configuration of wheel loader 1 shipped from a factory. Wheel loader 1 shipped from the factory comprises a computer 102B instead of computer 102A shown in FIG. 6. Computer 102B includes processor 103 and storage device 104.

Processor 103 includes operation data generation unit 161, timer 162, motion state image generation unit 165, specific viewpoint image generation unit 166, and work type estimation unit 167, similarly as shown in FIG. 6. Processor 103 also includes an image processing unit 171. Processor 103 does not include work type determination unit 164, determination unit 168, and adjustment unit 169 shown in FIG. 6. Storage device 104 has work type estimation model 180 trained.

Figure 11:
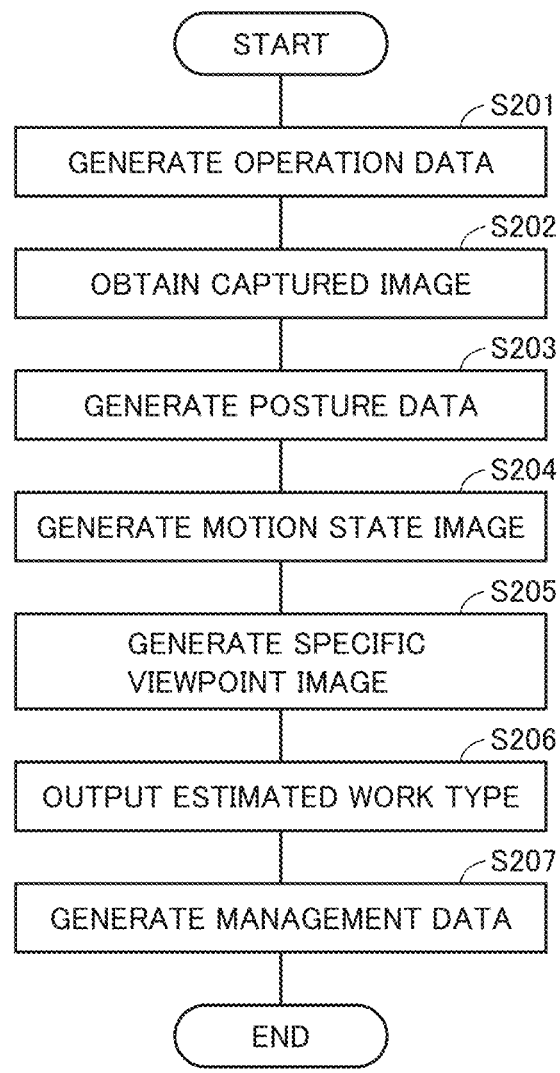
FIG. 11 is a flowchart of a process performed by the computer to estimate a work type after shipment from a factory.

FIG. 11 is a flowchart of a process performed by computer 102B to estimate a work type after shipment from a factory. A process for estimating a type of a work performed by wheel loader 1 while it is engaged in an excavation work after shipment from a factory will now be described below with reference to FIGS. 10 and 11.

Initially, in step S201, operation data 201 is generated. Computer 102B, more specifically, operation data generation unit 161 calculates a period of time elapsing at a point in time during an excavation work since the excavation work was started. Operation data generation unit 161 generates operation data for the point in time, based on a result of detection done by a variety of sensors including first hydraulic pressure detectors 28a, 28b, accelerator operation detection unit 51b, and vehicular speed detection unit 27.

Subsequently, in step S202, a captured image is obtained. Computer 102B, more specifically, image processing unit 171 obtains from imaging device 65 an image captured by imaging device 65. Wheel loader 1 is displayed in the captured image. Typically, at least a part of work implement 3 is displayed in the captured image.

Subsequently, in step S203, posture data is generated. Computer 102B, more specifically, posture data generation unit 163 outputs posture data, specifically, boom angle θ1 and bucket angle θ2, from the captured image captured by imaging device 65.

Posture data generation unit 163 may generate the posture data by obtaining in the captured image a position of a feature point set on work implement 3.

Figure 12:
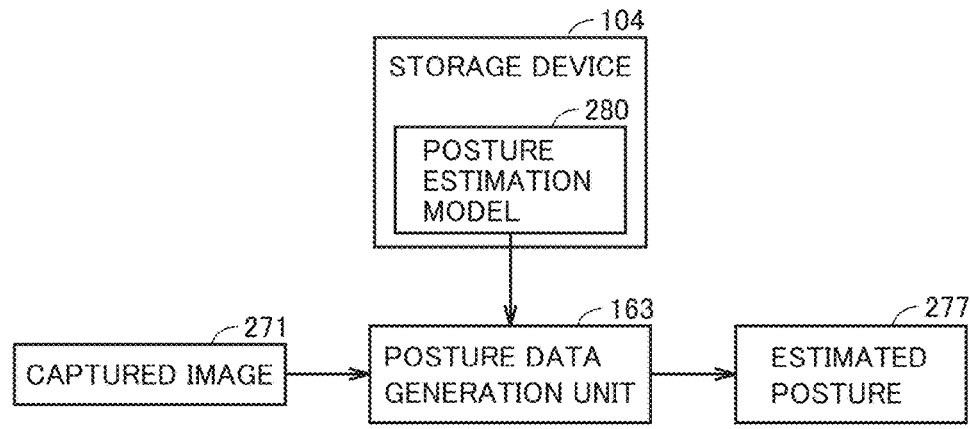
FIG. 12 is a block diagram showing a configuration of a system to estimate a posture of a work implement through a trained posture estimation model.
Figure 13:
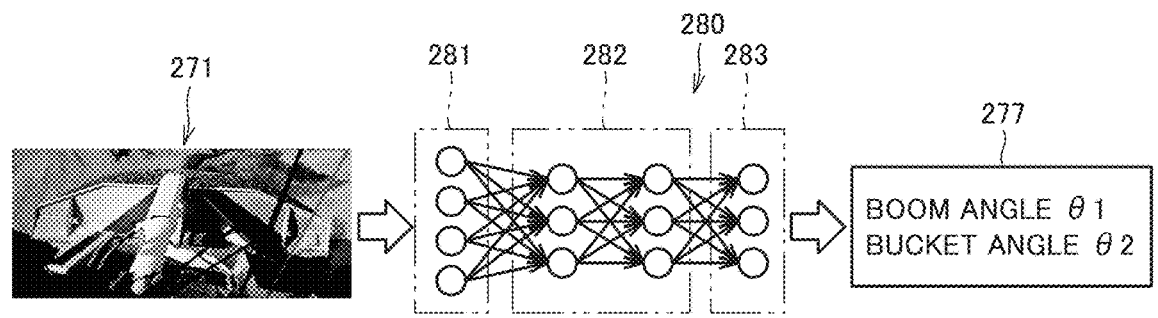
FIG. 13 is a schematic diagram showing a process of estimating a posture of the work implement from a captured image through a trained posture estimation model to determine a posture of the work implement from the captured image.

Alternatively, posture data generation unit 163 may generate the posture data through a trained posture estimation model of artificial intelligence. FIG. 12 is a block diagram showing a configuration of a system to estimate a posture of work implement 3 through posture estimation model 280 trained. FIG. 13 is a schematic diagram showing a process of estimating a posture of work implement 3 from a captured image 271 through posture estimation model 280 trained to determine the posture of work implement 3 from captured image 271.

Posture estimation model 280 is an artificial intelligence model for determining a posture of work implement 3 with respect to the vehicular body. Posture estimation model 280 is stored in storage device 104. Posture estimation model 280 includes the neural network shown in FIG. 13. Posture estimation model 280 includes, for example, a deep neural network such as a convolutional neural network (CNN).

The neural network includes an input layer 281, an intermediate layer (or a hidden layer) 282, and an output layer 283. Intermediate layer 282 is multi-layered. Input layer 281, intermediate layer 282 and output layer 283 have one or more units (or neurons). Input layer 281, intermediate layer 282 and output layer 283 can have their respective units set as appropriate in number.

Adjacent layers have their respective units connected to each other, and a weight is set for each connection. A bias is set for each unit. A threshold value is set for each unit. An output value of each unit is determined depending on whether a total sum of a product of a value input to each unit and the weight plus the bias exceeds the threshold value.

Posture estimation model 280 trained has been trained to determine a posture of work implement 3 from captured image 271. A parameter obtained for posture estimation model 280 through training is stored in storage device 104. The parameter for posture estimation model 280 for example includes the number of layers of the neural network, the number of units in each layer, a relationship between units in connectivity, a weight applied to a connection between each unit and another unit, a bias associated with each unit, and a threshold value for each unit.

Posture data generation unit 163 reads posture estimation model 280 and an optimal value of a trained parameter from storage device 104 to obtain posture estimation model 280 trained. Posture data generation unit 163 determines captured image 271 captured by imaging device 65 and obtained by image processing unit 171 as data input to posture estimation model 280. Posture data generation unit 163 inputs captured image 271 to each unit included in input layer 281 of posture estimation model 280 trained. An estimated posture 277 obtained by estimating a posture of work implement 3 with respect to the body of the work machine is output from output layer 283 of posture estimation model 280 trained. Specifically, estimated posture 277 includes boom angle θ1 and bucket angle θ2.

Thus, posture data generation unit 163 can estimate a posture of work implement 3 from captured image 271 through posture estimation model 280 trained to generate estimated posture 277.

Figure 14:
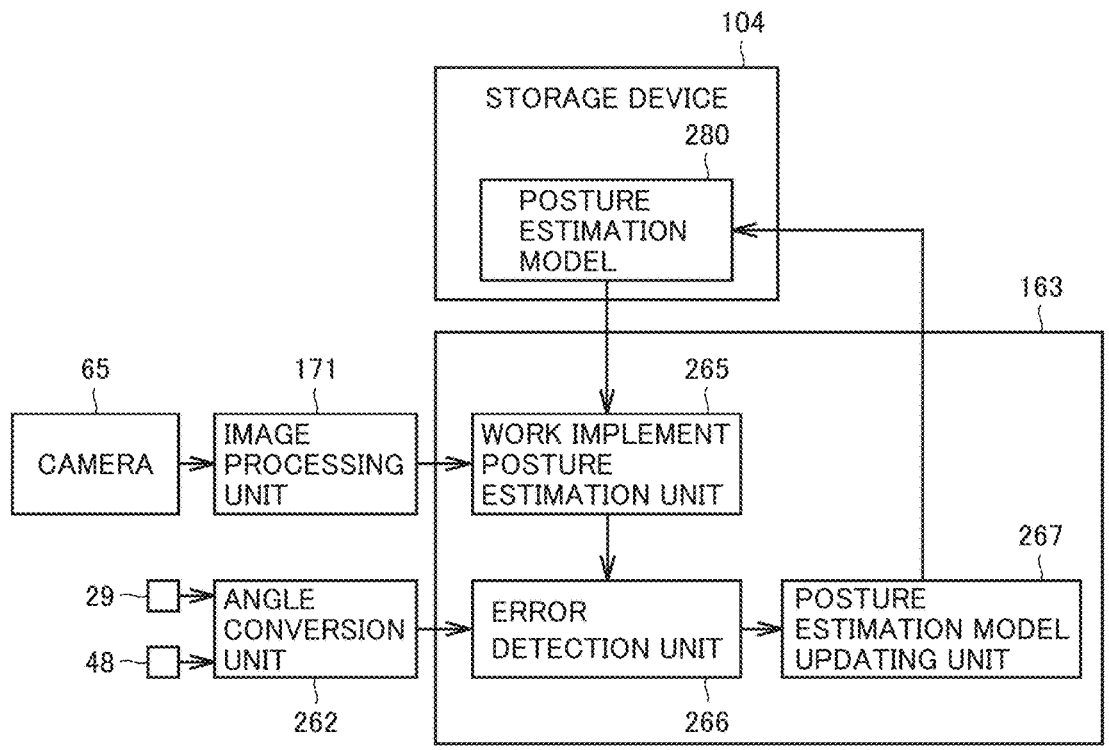
FIG. 14 is a block diagram showing a system configuration for training the posture estimation model.
Figure 15:
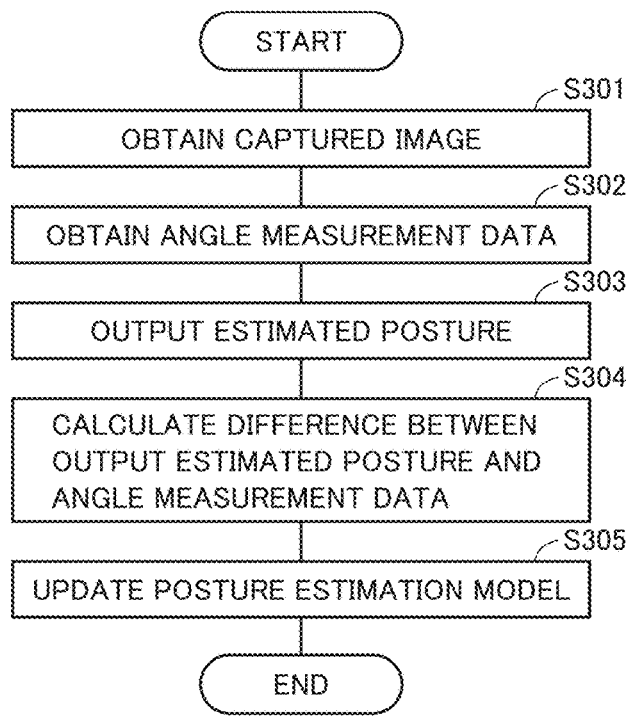
FIG. 15 is a flowchart of a method for producing a trained posture estimation model.
Figure 16:
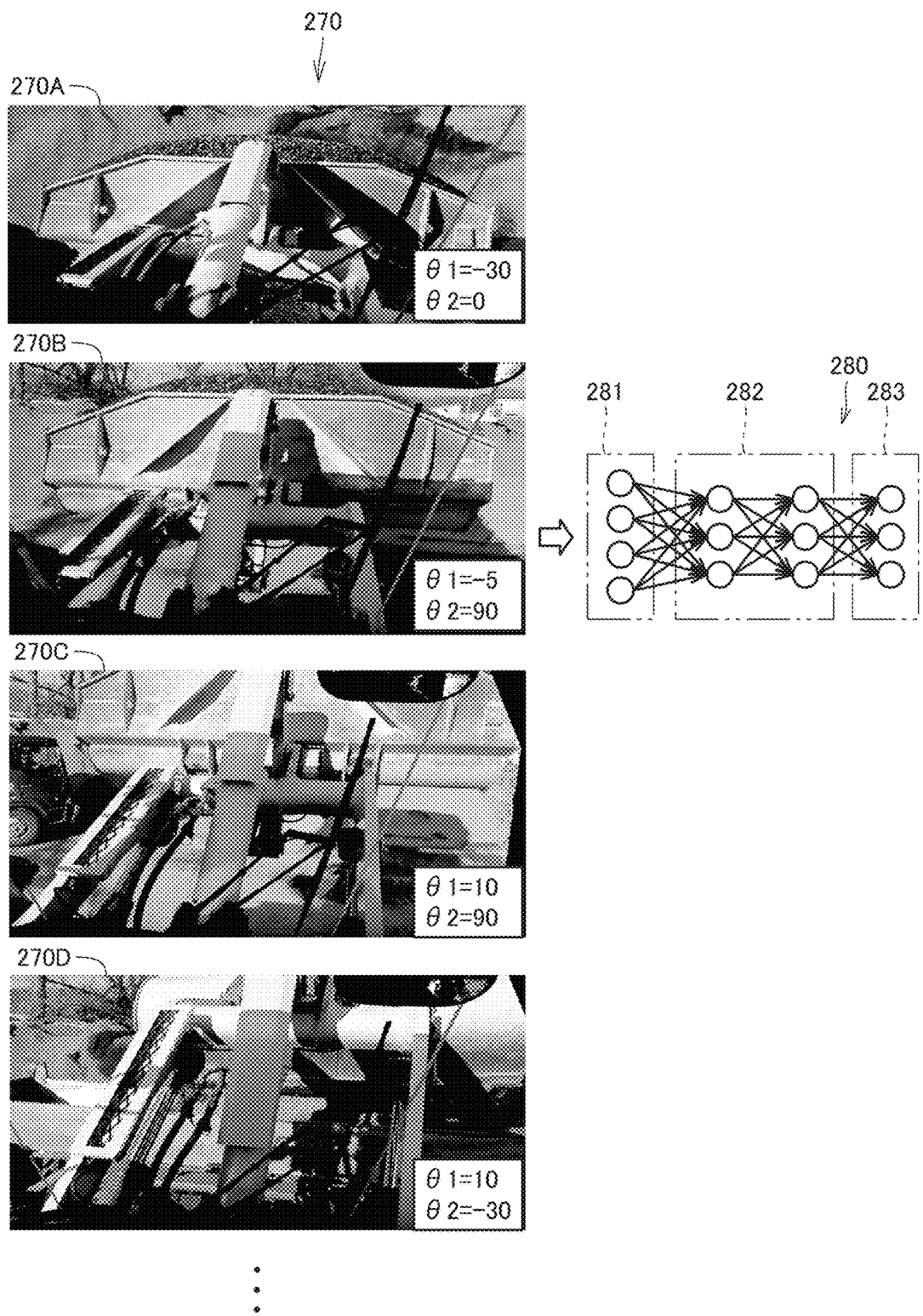
FIG. 16 is a schematic diagram showing a process for training the posture estimation model.

How posture estimation model 280 is trained will now be described below. FIG. 14 is a block diagram showing a system configuration for training posture estimation model 280. FIG. 15 is a flowchart of a method for producing posture estimation model 280 trained. FIG. 16 is a schematic diagram showing a process for training posture estimation model 280.

The system shown in FIG. 14 includes imaging device 65 and image processing unit 171. In step S301 shown in FIG. 15, image processing unit 171 receives from imaging device (a camera) 65 an image captured by imaging device 65. Image processing unit 171 subjects the received, captured image to image processing.

The system shown in FIG. 14 also includes first angle detector 29, second angle detector 48, and an angle conversion unit 262. In step S302 shown in FIG. 15, angle conversion unit 262 receives from first angle detector 29 a detection signal indicative of boom angle θ1 as detected. Angle conversion unit 262 receives from second angle detector 48 a detection signal indicative of bucket angle θ2 as detected. Boom angle θ1 and bucket angle θ2 configure posture data indicating a posture of work implement 3 with respect to the body of the work machine (or the vehicular body).

Angle conversion unit 262 obtains boom angle θ1 and bucket angle θ2 detected when imaging device 65 captures an image in association with the captured image. The captured image captured by imaging device 65 and including work implement 3, and boom angle θ1 and bucket angle θ2 at a point in time when the captured image is obtained configure training data for training the posture estimation model. FIG. 16 shows training data set 270, which includes a plurality of training data 270A, 270B, 270C and 270D, . . . , each labeling a captured image with posture data (boom angle θ1 and bucket angle θ2) of a posture of work implement 3 detected when the image is captured.

Training data set 270 may include a plurality of training data having different postures of work implement 3, as shown in FIG. 16. Training data set 270 may include a plurality of training data including captured images obtained by capturing images of work implement 3 in the same posture in different environments such as in daytime, backlight, and nighttime.

Posture data generation unit 163 includes a work implement posture estimation unit 265, an error detection unit 266, and a posture estimation model updating unit 267.

In step S303 shown in FIG. 15, work implement posture estimation unit 265 uses posture estimation model 280 to estimate a posture of work implement 3 from a captured image to obtain an estimated posture. More specifically, work implement posture estimation unit 265 reads posture estimation model 280 from storage device 104, and inputs a captured image to posture estimation model 280. Work implement posture estimation unit 265 uses the captured image as an input to input layer 281 to compute forward propagation of the neural network of posture estimation model 280. Thus, work implement posture estimation unit 265 obtains a result of estimation of boom angle θ1 and bucket angle θ2 as an output value output from output layer 283 of the neural network.

In step S304 shown in FIG. 15, error detection unit 266 compares the result of estimation of boom angle θ1 and bucket angle θ2 as estimated by work implement posture estimation unit 265 with the result of detection of boom angle θ1 and bucket angle θ2 as obtained in angle conversion unit 262. Error detection unit 266 calculates an error of the result of estimation with respect to true values of boom angle θ1 and bucket angle θ2.

Posture data generation unit 163 trains posture estimation model 280 using the captured image as input data, and the posture data of the posture of work implement 3 detected when the image is captured as teaching data. From the error of the output value as calculated, error detection unit 266 calculates through back propagation an error of a weight applied to a connection between each unit and another unit, an error of each unit's bias, and an error of the threshold value for each unit.

In step S305 shown in FIG. 15, posture estimation model updating unit 267 updates posture estimation model 280 based on the error of boom angle θ1 and bucket angle θ2 as calculated by error detection unit 266. Posture estimation model updating unit 267 updates parameters of posture estimation model 280 such as the weight applied to the connection between each unit and another unit, each unit's bias, and the threshold value for each unit. And once the same captured image is input to input layer 281, an output value closer to the true value can be output from output layer 283. Posture estimation model 280 has the updated parameters stored to storage device 104.

When a posture of work implement 3 is estimated next time, a captured image is input to the updated posture estimation model 280 to obtain an output of a result of estimation of a posture of work implement 3. Posture data generation unit 163 repeats step S301 to step S305 until a result of estimation of a posture of work implement 3 that posture estimation model 280 outputs matches posture data of the posture of work implement 3 as detected. In this way, posture estimation model 280 has its parameters optimized and is thus trained.

Once posture estimation model 280 has sufficiently been trained, and as a result come to output a sufficiently accurate estimation result, posture data generation unit 163 ends training posture estimation model 280. Posture estimation model 280 trained is thus produced. The process then ends ("END" indicated in FIG. 15).

Referring back to FIGS. 10 and 11, subsequently, in step S204, a motion state image is generated. Computer 102B, more specifically, motion state image generation unit 165 generates a three-dimensional model representing a stereoscopic shape of wheel loader 1 based on the posture data generated in step S203. Motion state image generation unit 165 generates a motion state image including the three-dimensional model and the operation data generated in step S201.

Subsequently, in step S205, a specific viewpoint image is generated. Computer 102B, more specifically, specific viewpoint image generation unit 166 generates a two-dimensional image of the three-dimensional model from the motion state image that is generated in step S204, as viewed at a specific viewpoint position that is a viewpoint position indicating a position of a viewpoint at which the three-dimensional model is virtually viewed. Specific viewpoint image generation unit 166 generates a specific viewpoint image including the two-dimensional image and the operation data.

Subsequently, in step S206, a work type is estimated. Computer 102B, more specifically, work type estimation unit 167 reads work type estimation model 180 and an optimal value for a trained parameter from storage device 104 to obtain work type estimation model 180 trained.

Work type estimation unit 167 uses the specific viewpoint image that is generated in step S205 as data input to work type estimation model 180. Work type estimation unit 167 inputs the specific viewpoint image to each unit included in input layer 181 of work type estimation model 180 trained. An estimated work type 177 (see FIG. 10), which is an estimated current motion of wheel loader 1 engaged in an excavation work, is output from output layer 183 of work type estimation model 180 trained.

Finally, in step S207, computer 102B generates management data including the work type. Computer 102B records the management data in storage device 104. The process thus ends ("END" in FIG. 11).

Thus, in the system according to the embodiment, as shown in FIGS. 10 and 11, computer 102B estimates a posture of work implement 3 with respect to the body of the work machine in a captured image of wheel loader 1. Computer 102B creates a three-dimensional model representing a stereoscopic shape of wheel loader 1 based on the posture of work implement. Computer 102B creates image data including a two-dimensional image of the three-dimensional model, as viewed at a viewpoint position indicating a position of a viewpoint at which the three-dimensional model is virtually viewed.

This will allow wheel loader 1 to be clearly displayed in the two-dimensional image of the three-dimensional model as viewed in a specific direction, and a two-dimensional image clearly displaying wheel loader 1 to be easily obtained. When a viewpoint position is set for example at a position, such as exactly sideways of wheel loader 1, allowing work implement 3 to be generally viewed, and a two-dimensional image is thus created and used to classify a work into a type, it is possible to reduce disturbance caused by an effect of an obstacle or the like against movement of wheel loader 1 at work. Thus, a work can be classified into a type with high accuracy.

As shown in FIG. 1, imaging device 65 is mounted on cab 5, and an image to be used to estimate a posture of work implement 3 is captured by imaging device 65. When work implement 3 is imaged by imaging device 65 and computer 102B classifies a work into a type from a two-dimensional image created based on the captured image, wheel loader 1 capable of classifying a work into a type simply in a configuration mounted on the vehicular body can be implemented.

As shown in FIGS. 8 and 9, the above image data includes operation data for motion of wheel loader 1. Using the image data including the operation data to classify a work into a type allows the work to be classified into the type further accurately.

As shown in FIGS. 8 and 9, the above operation data includes data for traveling of wheel loader 1. As the operation data specific to wheel loader 1 that travels and performs a work is included in an image used to classify a work into a type, classification of a work into a type that is specific to wheel loader 1 can be performed with high accuracy.

As shown in FIG. 13, posture estimation model 280 trained is used to estimate a posture of work implement 3 from captured image 271 to determine estimated posture 277. Posture estimation model 280 of artificial intelligence suitable for estimating a posture of work implement 3 can be used to estimate the posture of work implement 3 easily and accurately. Captured image 271 may be captured by imaging device 65, and in that case, a posture of work implement 3 can be estimated simply by a configuration mounted on the vehicular body. This allows estimation of a posture of work implement 3 closer to a real-time image thereof, and causing display unit 40 (see FIG. 2) to display a result of the estimation can rapidly notify the operator of the result of the estimation.

<Modified Example for Training Work Type Estimation Model 180>

Figure 17:
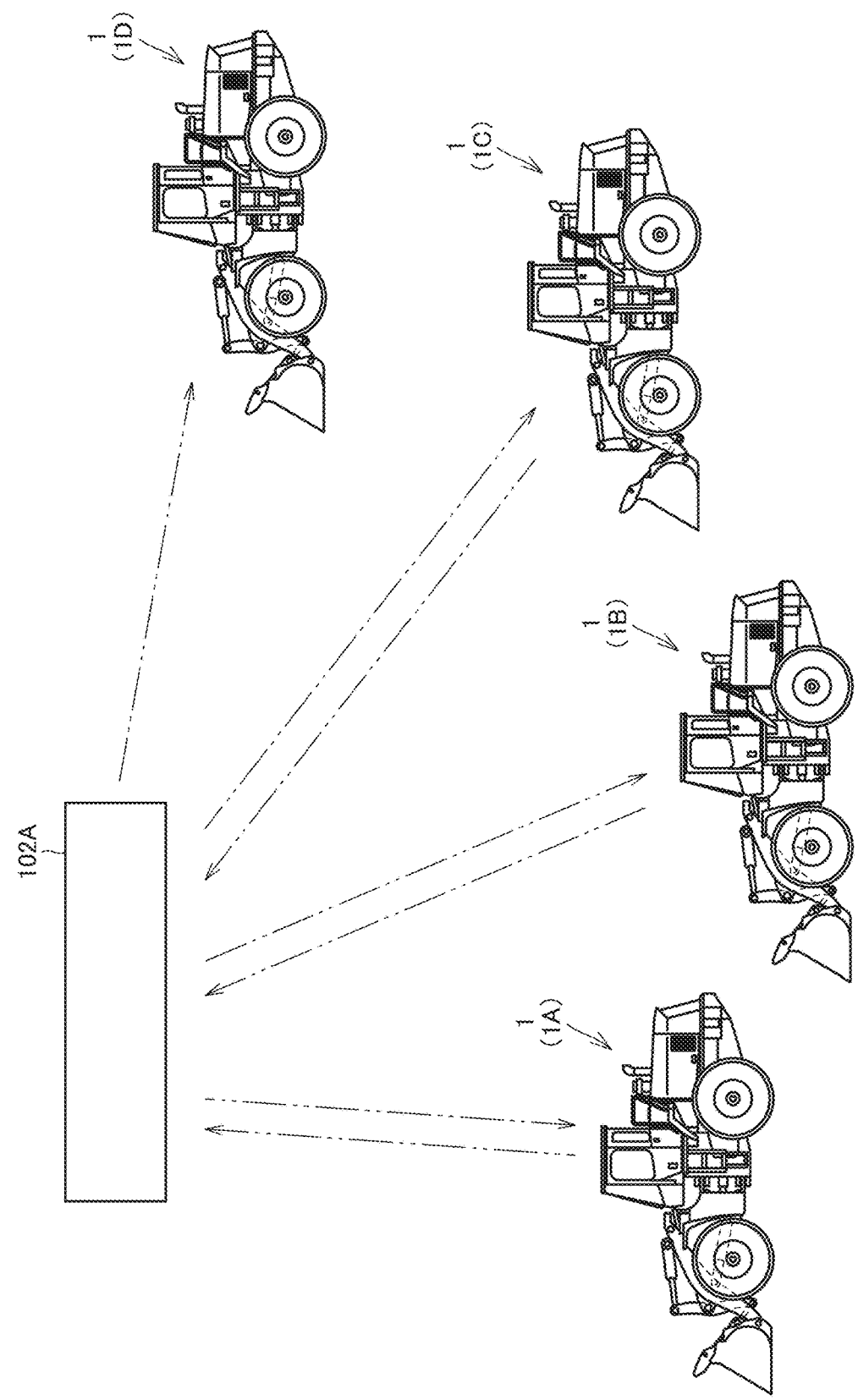
FIG. 17 is a schematic diagram showing a modified example for training the work type estimation model.

FIG. 17 is a schematic diagram showing a modified example for training work type estimation model 180. In the description of FIGS. 6 to 9 has been described an example in which work type estimation model 180 is trained before wheel loader 1 is shipped from a factory. Training data for training work type estimation model 180 may be collected from a plurality of wheel loaders 1.

A first wheel loader 1 (wheel loader 1A), a second wheel loader 1 (wheel loader 1B), and a third wheel loader 1 (wheel loader 1C) shown in FIG. 12 are of the same model. Wheel loaders 1A, 1B, 1C have been shipped from a factory and are currently each located at a work site.

Computer 102A obtains operation data 201 and posture data 203 from each wheel loader 1A, 1B, 1C. Computer 102A generates motion state image 205 based on posture data 203, and further generates specific viewpoint image 206. Computer 102A also obtains result 204 of classifying a work into a type in association with posture data 203. Using these training data, computer 102A trains work type estimation model 180 to be able to estimate a work type from specific viewpoint image 206 and operation data 201 to obtain an estimated work type.

Computer 102A may obtain operation data 201, posture data 203 and result 204 of classifying a work into a type from each of wheel loaders 1A, 1B, 1C via communication interface 105 (see FIG. 5). Alternatively, computer 102A may obtain operation data 201, posture data 203 and result 204 of classifying a work into a type from each of wheel loaders 1A, 1B, 1C via external recording medium 109.

Computer 102A may be located at the same work site as wheel loaders 1A, 1B, 1C. Alternatively, computer 102A may be located in a remote place away from a work site, such as a management center for example. Wheel loaders 1A, 1B, 1C may be located at the same work site or at different work sites.

Work type estimation model 180 trained is provided to each wheel loader 1A, 1B, 1C via communication interface 105, external recording medium 109, or the like. Each wheel loader 1A, 1B, 1C is thus provided with work type estimation model 180 trained.

When work type estimation model 180 is already stored in each wheel loader 1A, 1B, 1C, work type estimation model 180 stored is overwritten. Work type estimation model 180 may be overwritten periodically by collecting training data and training work type estimation model 180, as described above, periodically. Whenever work type estimation model 180 has a parameter updated, the latest, updated value is stored to storage device 104.

Work type estimation model 180 trained is also provided to a fourth wheel loader 1 (wheel loader 1D). Work type estimation model 180 is provided to both wheel loaders 1A, 1B, 1C that provide training data and wheel loader 1D that does not provide training data. Wheel loader 1D may be located at the same work site as any of wheel loaders 1A, 1B, 1C, or may be located at a work site different than wheel loaders 1A, 1B, 1C. Wheel loader 1D may be before shipment from a factory.

Wheel loader 1D may be of a model different from wheel loaders 1A, 1B, and 1C. For example, wheel loaders 1A, 1B, and 1C may be of a medium or larger model, and wheel loader 1D may be of a small model. Wheel loaders do not have a significant difference in a ratio of the work implement to the body of the work machine, irrespective of the size of the vehicular body. Work type estimation model 180 which has obtained posture data in a model of a medium or larger type with a sensor mounted therein/thereon and has been trained to associate a work type with a posture of a work implement can be applied to wheel loader 1D that is of a small model having no sensor. This allows accurate work type estimation even for a model of a small type.

In the above embodiment, work type estimation model 180 includes a neural network. This is not exclusive, however, and work type estimation model 180 may be a model, such as a support vector machine, a decision tree, or the like capable of accurately estimating a work type from image data through machine learning.

While in the embodiment has been described an example in which a work type is estimated in first processor 30, this is not exclusive, and a work type may be estimated in second processor 70.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST 1, 1A, 1B, 1C, 1D wheel loader, 2 vehicular frame, 2a front frame, 2b rear frame, 3 work implement, 4 traveling apparatus, 5 cab, 6 bucket, 6a teeth, 9 boom pin, 14 boom, 16 boom cylinder, 17 bucket pin, 19 bucket cylinder, 27 vehicular speed detection unit, 28a, 28b first pressure detector, 29 first angle detector, 30 first processor, 30j storage unit, 45 output unit, 48 second angle detector, 49 forward and rearward travel switching apparatus, 51 accelerator operation apparatus, 52 boom operation apparatus, 53 shift change operation apparatus, 54 bucket operation apparatus, 55 articulation operation apparatus, 58 brake operation apparatus, 65 imaging device, 70 second processor, 100 object to be excavated/excavated object, 102A, 102B computer, 103 processor, 104 storage device, 110 dump track, 161 operation data generation unit, 162 timer, 163 posture data generation unit, 164 work type determination unit, 165 motion state image generation unit, 166 specific viewpoint image generation unit, 167 work type estimation unit, 168 determination unit, 169 adjustment unit, 171 image processing unit, 177 estimated work type, 180 work type estimation model, 181, 281 input layer, 182, 282 intermediate layer, 183, 283 output layer, 188A, 188B, 270A, 270B, 270C, 270D training data, 201 operation data, 203 posture data, 204 result of classifying a work into a type, 205 motion state image, 206 specific viewpoint image, 262 angle conversion unit, 265 work implement posture estimation unit, 266 error detection unit, 267 posture estimation model updating unit, 270 training data set, 271 captured image, 277 estimated posture, 280 posture estimation model.

The invention claimed is:

1. A system including a work machine, comprising:
the work machine, which has a body of the work machine and a work implement attached to the body of the work machine;
an imaging device mounted on the body of the work machine, the imaging device captures a captured image including at least a portion of the work implement; and
a computer, wherein the computer:
obtains the captured image including the at least the portion of the work implement,
generates an estimated posture obtained by estimating a posture of the work implement with respect to the body of the work machine from the captured image,
creates a three-dimensional model representing a stereoscopic shape of the work machine based on the generated estimated posture, the three-dimensional model includes data of the body of the work machine and data of the work implement,
sets a viewpoint position indicating a position of a viewpoint at which the three-dimensional model is virtually viewed, and
creates image data including a two-dimensional image of the three-dimensional model as viewed at the viewpoint position.

2. The system according to claim 1, wherein the image data includes operation data for motion of the work machine.

3. The system according to claim 2, wherein the operation data includes data for traveling of the work machine.

4. The system according to claim 1, wherein
the computer has a trained posture estimation model for determining a posture of the work implement, and
the computer is programmed to use the trained posture estimation model to estimate a posture of the work implement from the captured image to determine an estimated posture.

5. The system according to claim 4, wherein the trained posture estimation model undergoes a learning process using a training data set so that when the captured image is received, the trained posture estimation model outputs the estimated posture from the captured image.

6. The system according to claim 4, wherein the trained posture estimation model is generated through a learning process using a training data set including training data each labeling the captured image with a posture of the work implement.

7. A work machine comprising:
a body of the work machine;
a work implement attached to the body of the work machine;
an imaging device mounted on the body of the work machine, the imaging device captures a captured image including at least a portion of the work implement; and
a computer mounted in the body of the work machine, wherein the computer:
obtains the captured image including the at least the portion of the work implement,
generates an estimated posture obtained by estimating a posture of the work implement with respect to the body of the work machine from the captured image,
creates a three-dimensional model representing a stereoscopic shape of the work machine based on the generated estimated posture, the three-dimensional model includes data of the body of the work machine and data of the work implement,
sets a viewpoint position indicating a position of a viewpoint at which the three-dimensional model is virtually viewed, and
creates image data including a two-dimensional image of the three-dimensional model as viewed at the viewpoint position.

* * * * *